INVENTORS
JAMES T. MOYER
FRANCIS R. RAUSCH
BY Francis V. Giolma
ATTORNEY

Feb. 7, 1967  J. T. MOYER ETAL  3,303,476
INPUT/OUTPUT CONTROL

Filed April 6, 1964  20 Sheets-Sheet 4

FIG. 3

Figure 3A:
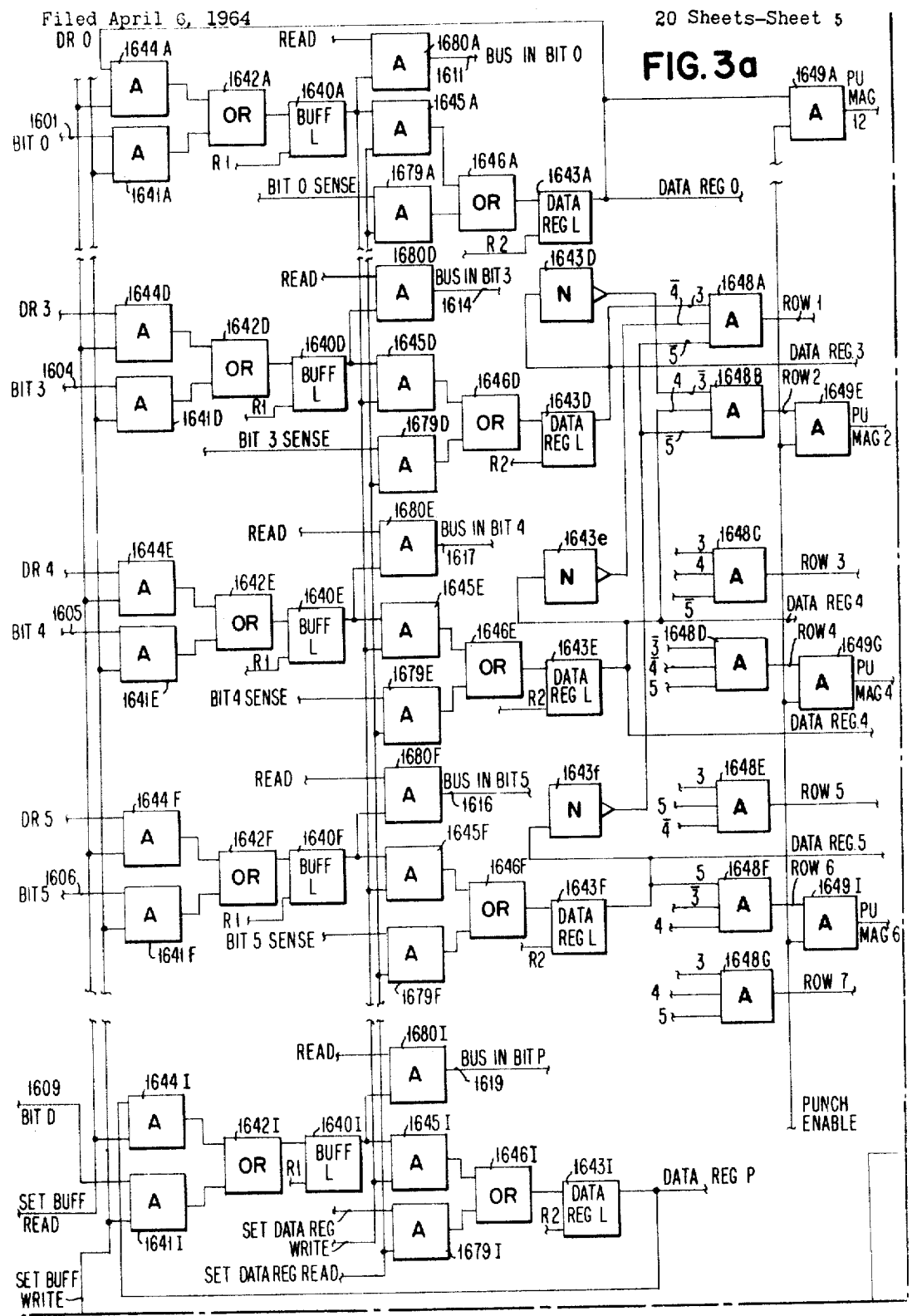
Figure 3B:
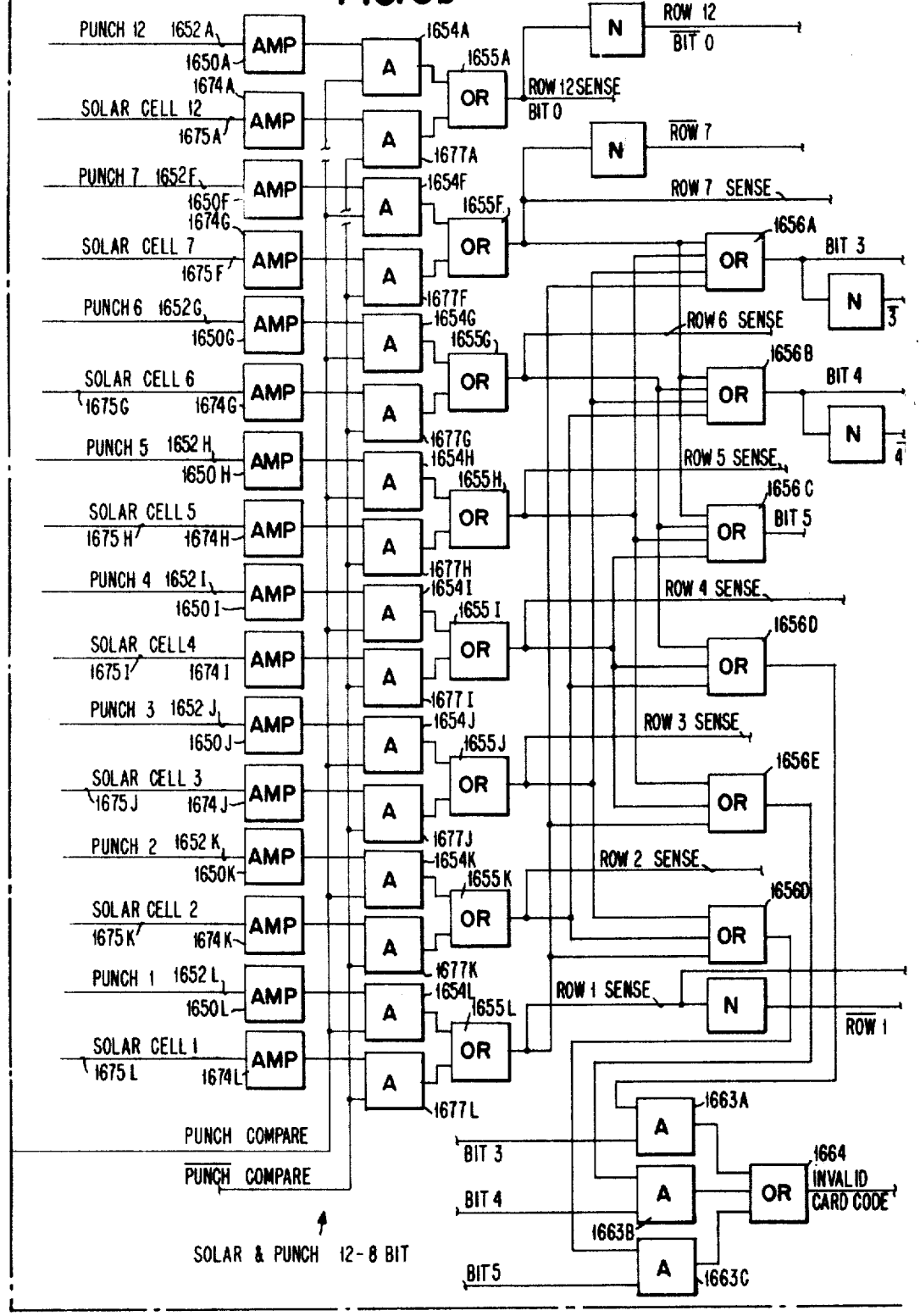
Figure 3C:
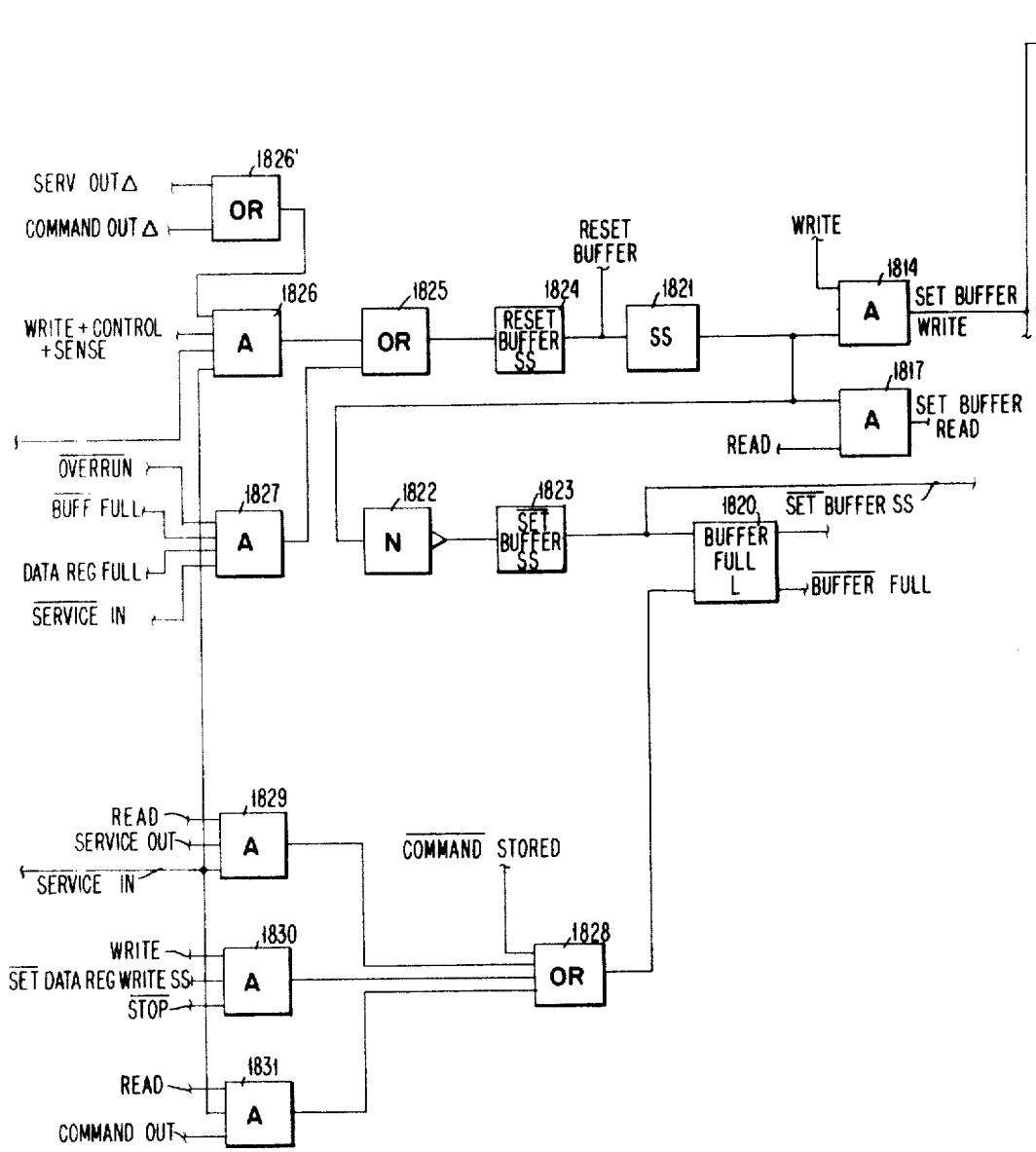
Figure 3D:
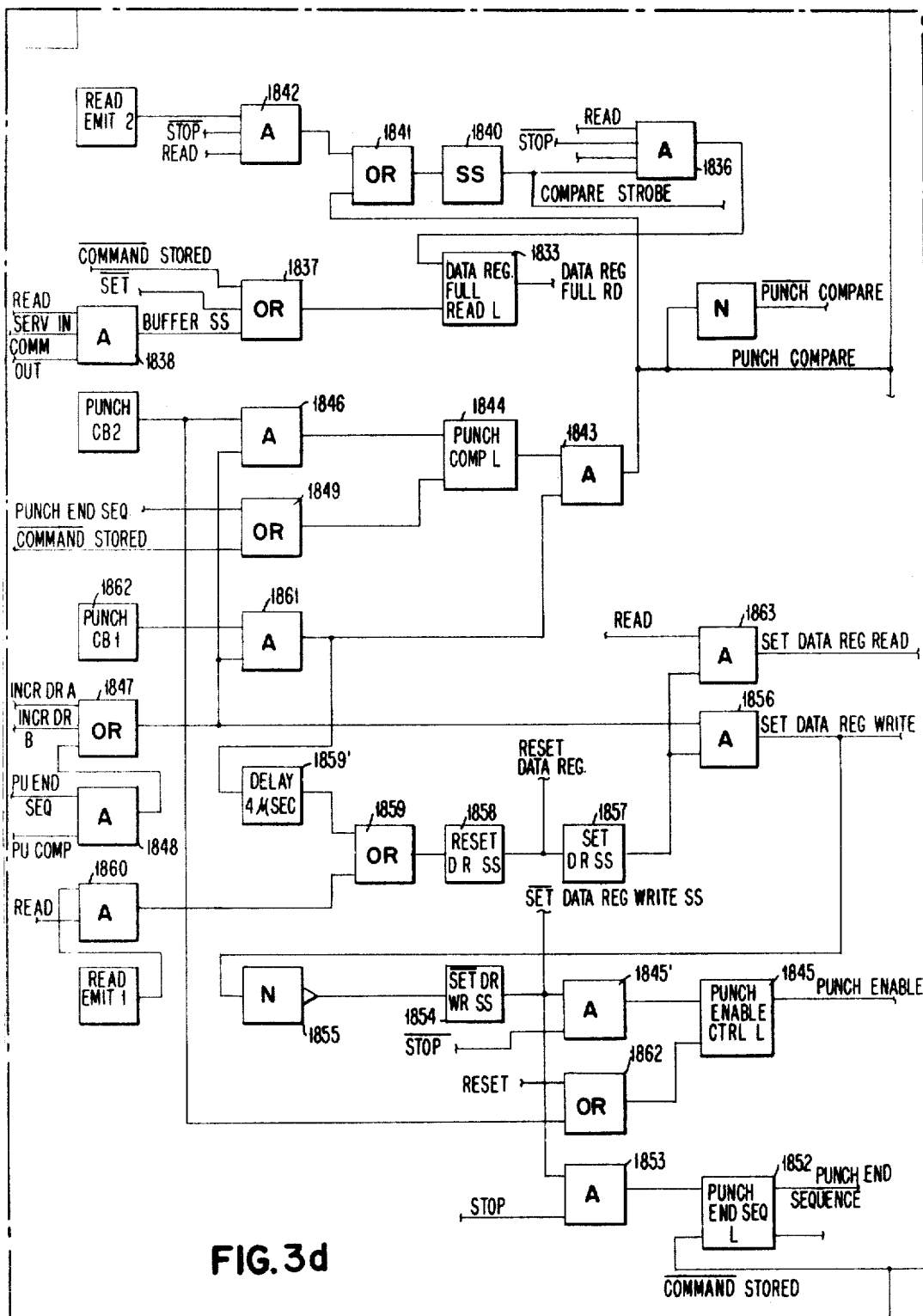
Figure 3E:
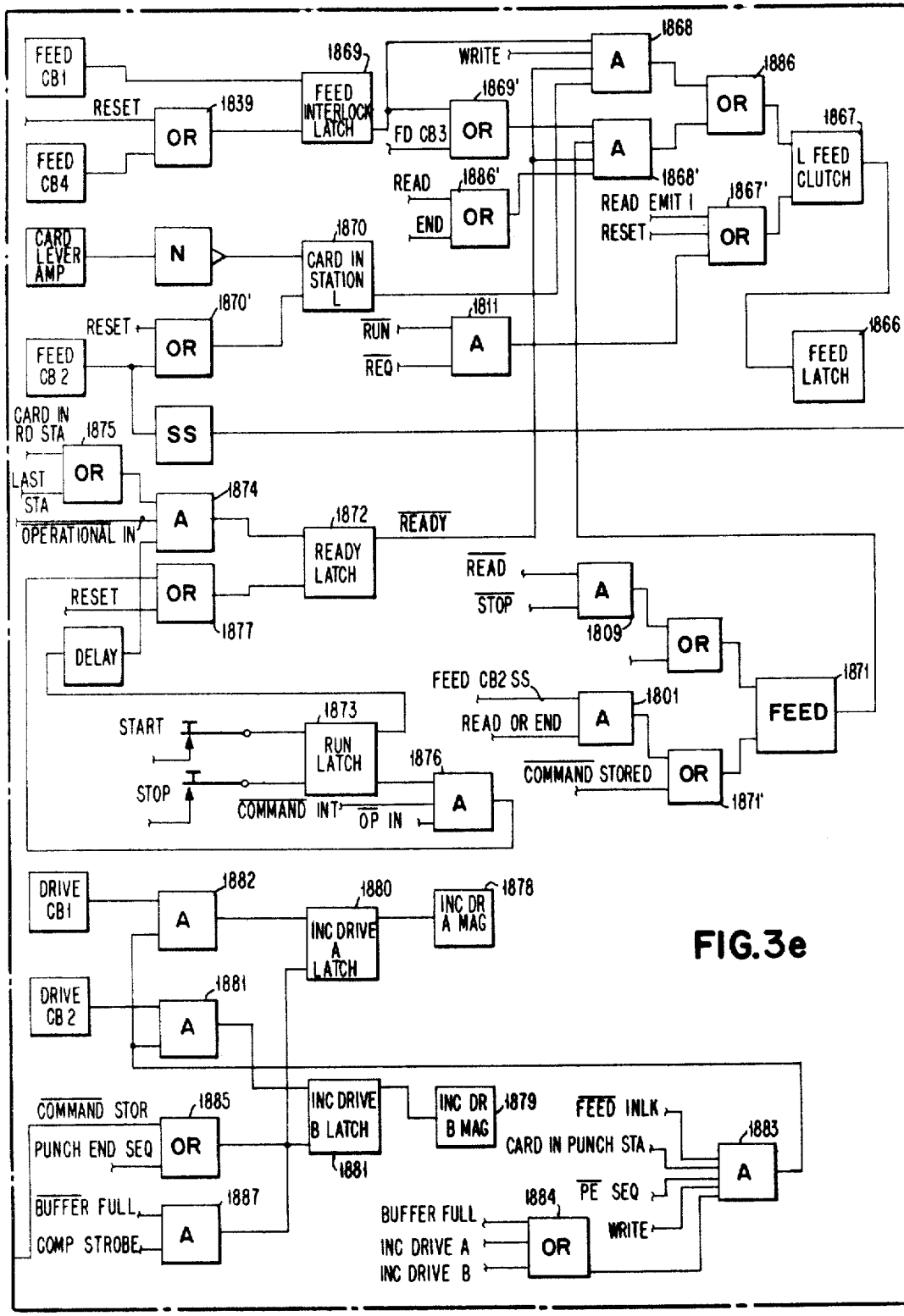
Figure 3F:
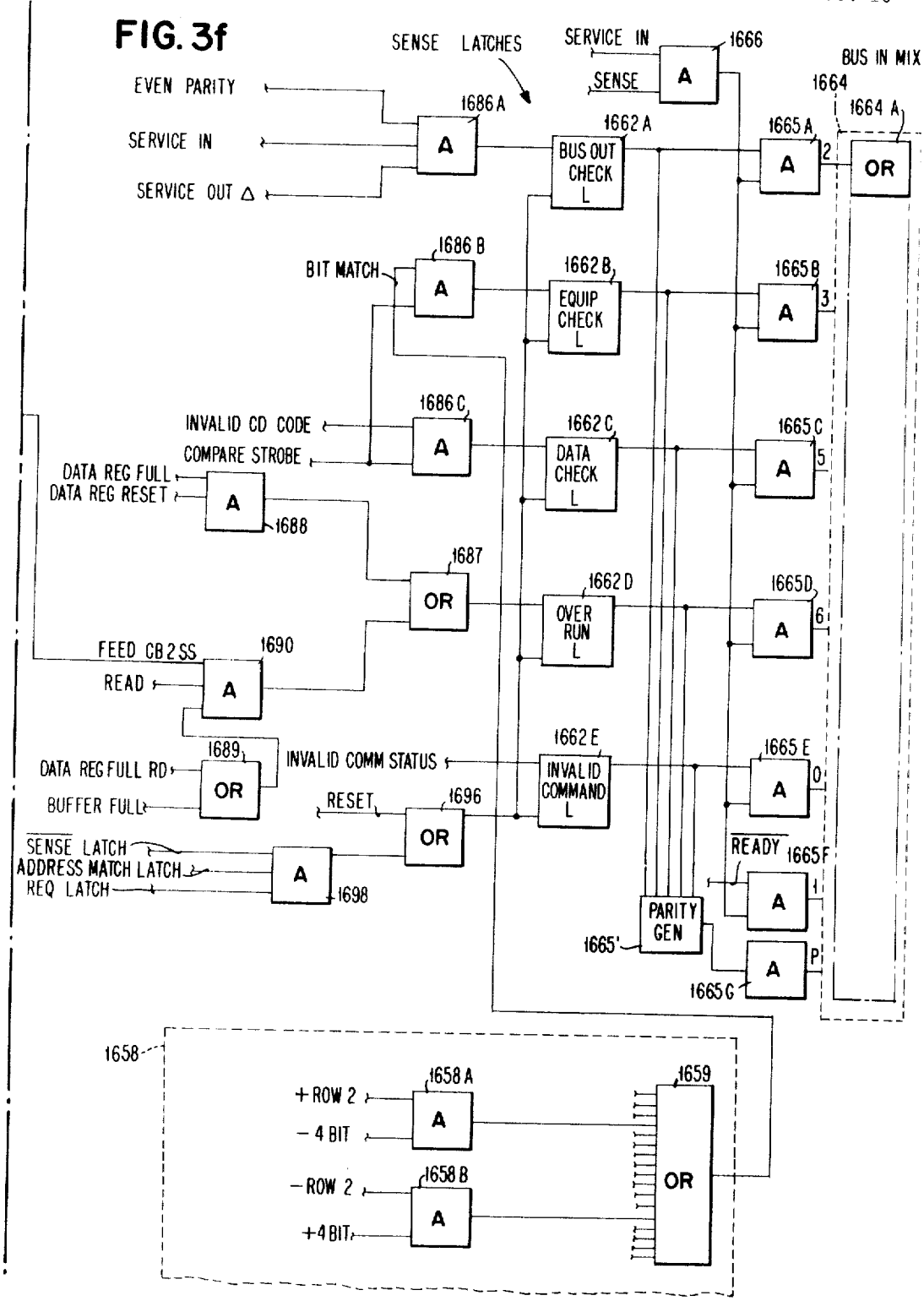
Figure 3G:
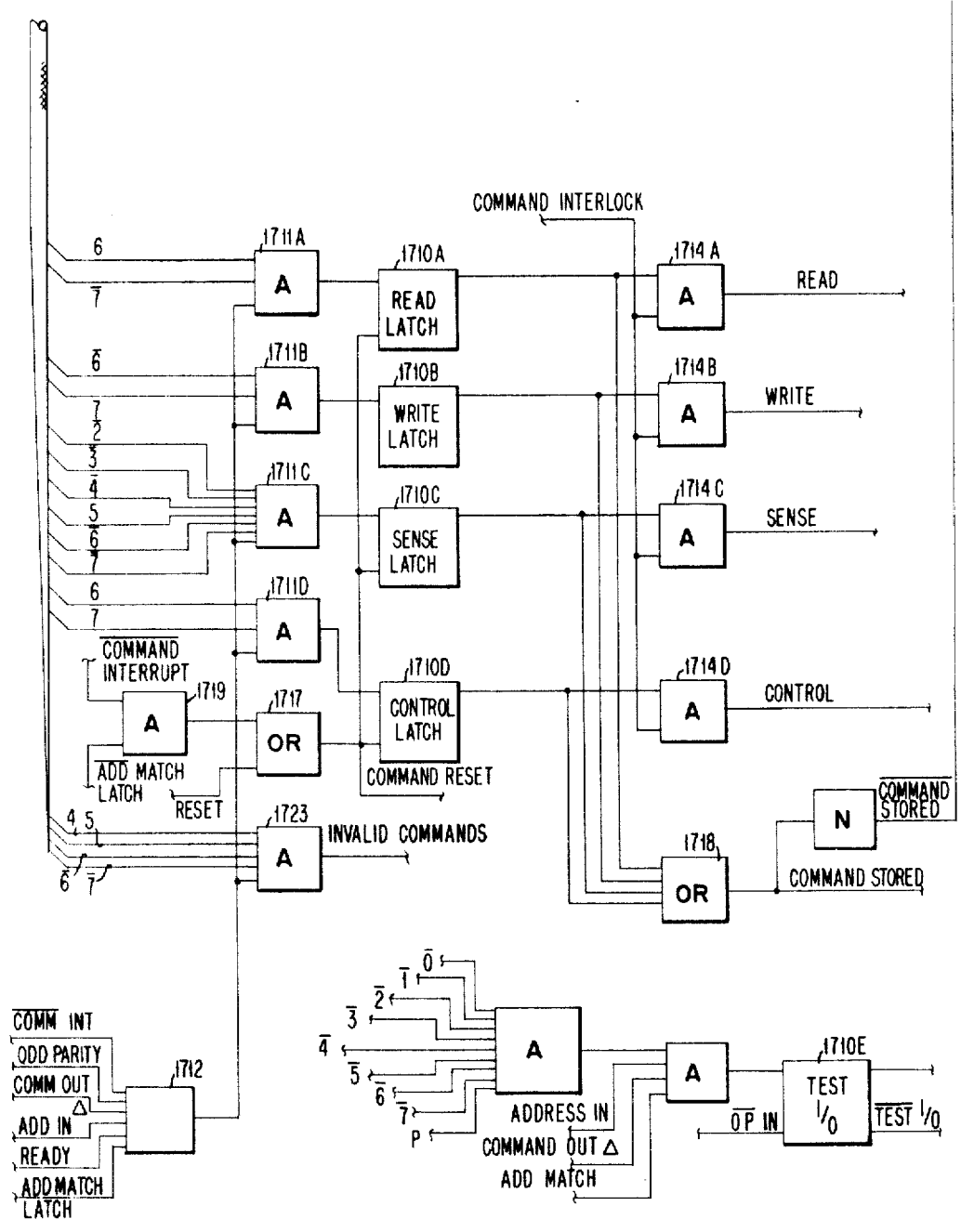
Figure 3H:
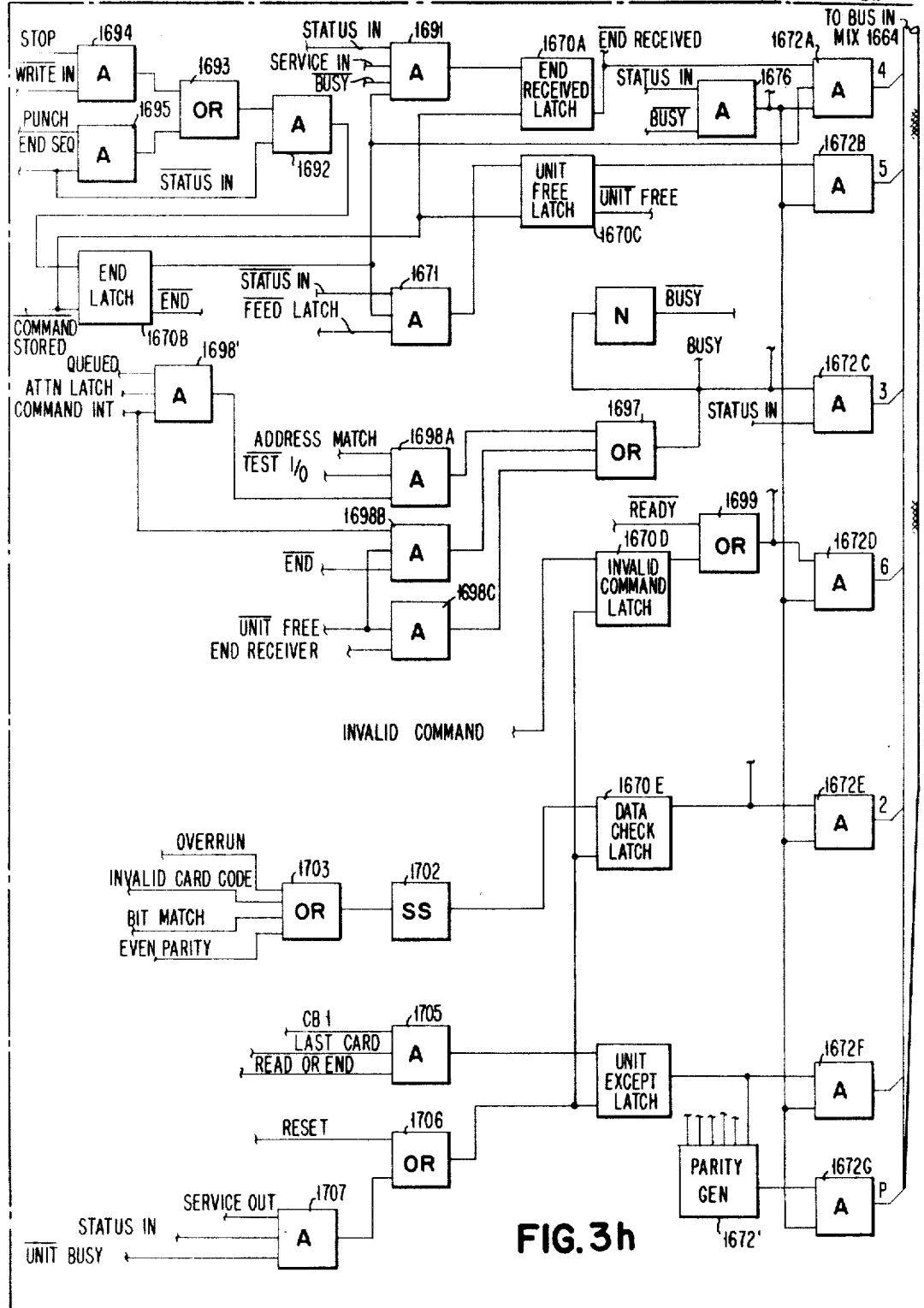
Figure 3J:
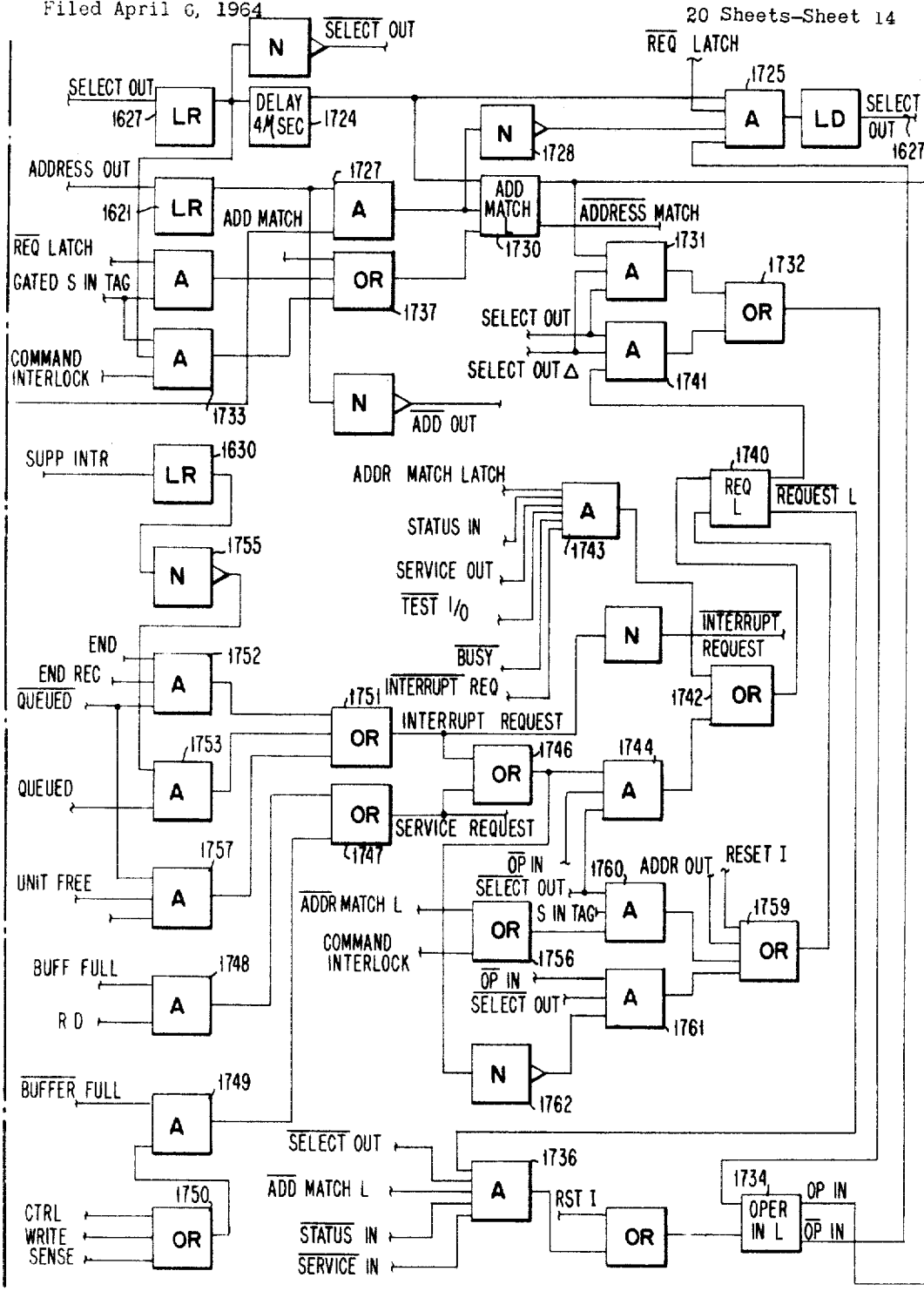
Figure 3K:
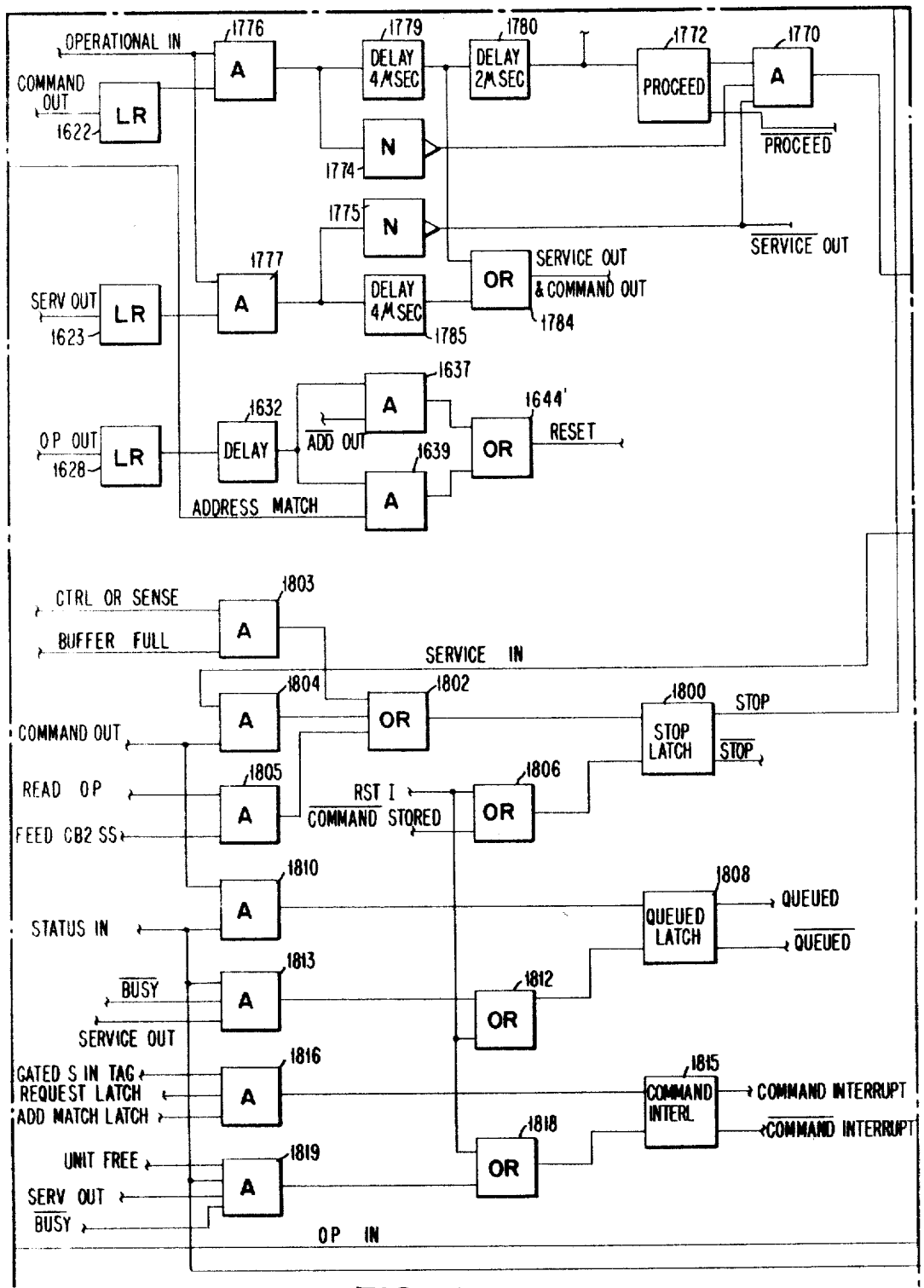
Figure 31:
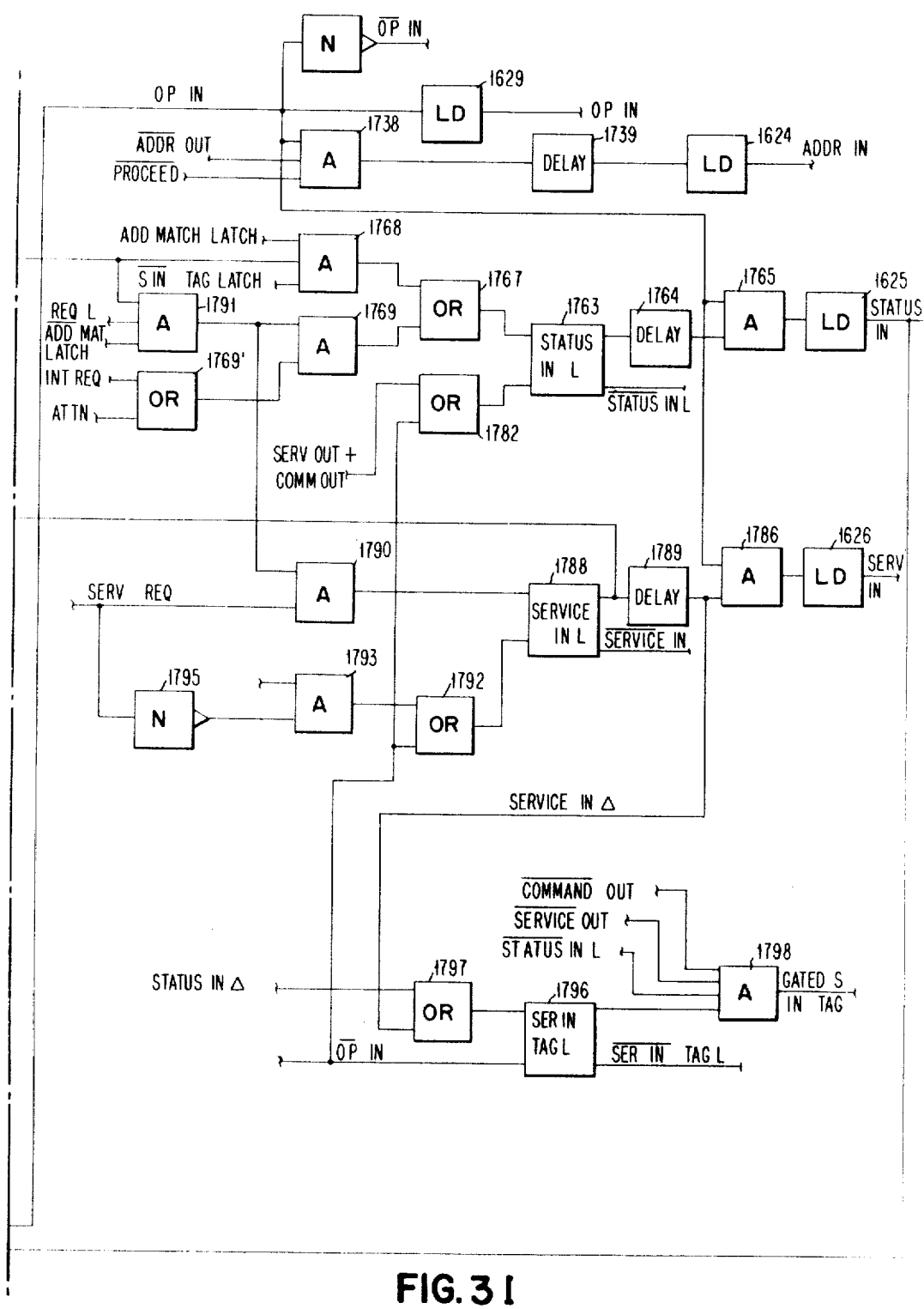

| FIG. 3a | FIG. 3b |
| FIG. 3c | FIG. 3d | FIG. 3e | FIG. 3f |
| FIG. 3g | FIG. 3h |
| FIG. 3i | FIG. 3j | FIG. 3k | FIG. 3l |

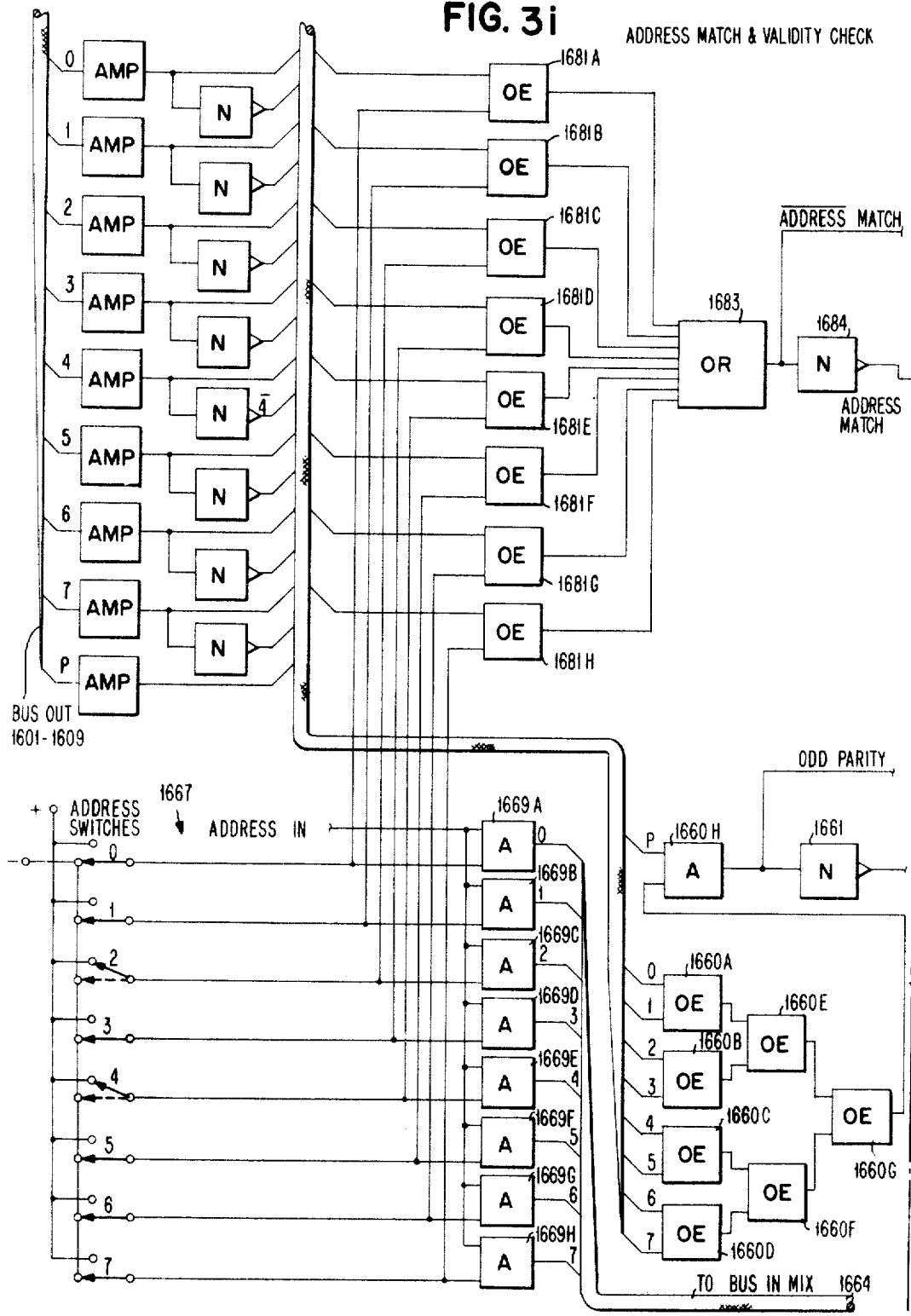

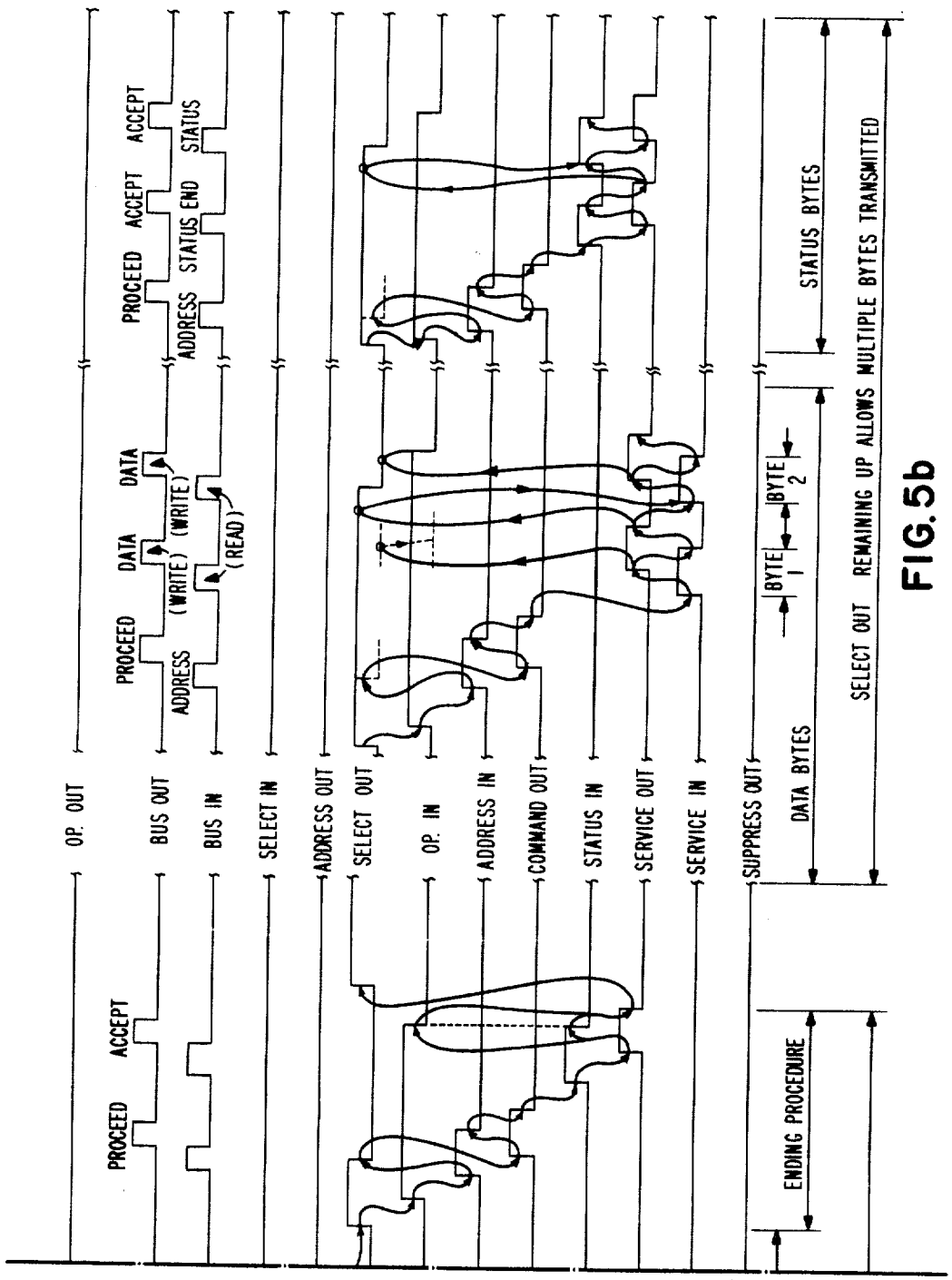

United States Patent Office
3,303,476
Patented Feb. 7, 1967

3,303,476
INPUT/OUTPUT CONTROL
James T. Moyer, Endicott, and Francis R. Rausch, Vestal, N.Y., assignors to International Business Machines Corporation, New York, N.Y., a corporation of New York
Filed Apr. 6, 1964, Ser. No. 357,383
7 Claims. (Cl. 340—172.5)

This invention relates generally to data entry and reception apparatus for a stored program computer and it has reference in particular to multiplex channel operation of input/output controls for such a computer.

In the operation of a computer at a central location a large number of input/output devices are generally utilized therewith and it is frequently necessary for the computer to request information from or supply information to different ones of a large number of peripheral I/O (input/output) devices such as reader punches, printers, tape drives, etc. Since each of these operations involves times during which the I/O device is operating in response to an instruction from the computer but has not yet generated the data called for, it is expedient to utilize an arrangement wherein different ones of the I/O devices can seize the channel and communicate during such times so as to permit simultaneous operation of a number of such devices.

Accordingly, in the present invention a system has been provided wherein a plurality of I/O control devices can utilize a single channel for communication with or from the central processing unit, in accordance with the requirement of a micro-program routine of the central processing unit. The several I/O control units are periodically polled by rippling a select out signal over the channel through the control units. Selection of a unit can be made by the processing unit, or the I/O units are able in their order of priority to seize the channel for the purpose of transmitting data to the processing unit as the signal ripples through the control units.

It is therefore an object of this invention to provide an improved data entry and reception system for a stored program computer.

It is also an object of this invention to provide I/O control apparatus which permits of the entry or reception of data by either a burst or interleave mode.

Another object of the invention is to provide for checking the status of an I/O device whenever the device is selected for an operation by the central processing unit.

Yet another object of this invention is to provide for periodically polling a plurality of I/O control units for either selecting one of them under the control of a central processing unit, or permitting one of the I/O control units to seize the channel in order of priority for transmitting data to the central unit.

A further object of the invention is to provide improved data entry and reception apparatus in which the control of a plurality of the I/O control units is under the control of a central processing unit.

It is also an object of the present invention to provide data entry and reception apparatus in which a plurality of I/O control units are periodically polled to normally permit either one of them to seize the channel connecting them to the central processing unit or the channel to select one of the I/O devices depending on the order of priority of the particular devices, and for providing selectively for suppressing selection of the channel by any of the I/O devices so as to permit the channel selection of an I/O device to have priority.

The present invention is adapted to be used in conjunction with a program controlled computer having a central processing unit connected to a plurality of control units of remote input/output devices by a channel comprising an interface and certain hardware in the central processing unit which together provide a channel for transmitting data to and fro between the central processing unit and control units, along with the necessary control, selection and interlocking signals. Such a computer is described in detail in the copending application Serial No. 357,372 being filed concurrently herewith, not only as regards the circuitry of the central processing unit but also as regards the micro-programming, generation of signals sent to the control units, and the receipt of signals therefrom together with the responses thereof.

As described hereinafter, the present invention is directed primarily to the structure and functioning of the input/output device control units which provide the connections between the I/O device and the interface which connects the control unit to the central processing unit. The interface together with hardware in the central processing unit provide a multiplex channel over which operations may be had in either of two modes—(1) byte multiplex or (2) burst mode. In byte multiplex mode the channel can handle a large number of I/O devices operating simultaneously, the channel being captured only for a short period of time by one device for the transmission of one byte of data, whereupon the channel becomes available to the same or other devices on a priority basis. In burst mode, the I/O device remains attached to the channel for selection and transmission of a relatively large amount of data (usually a complete record).

The foregoing and other objects and other features and advantages of the invention will be apparent from the following more particular description of a preferred embodiment of the invention as illustrated in the accompanying drawings.

Figure 1:
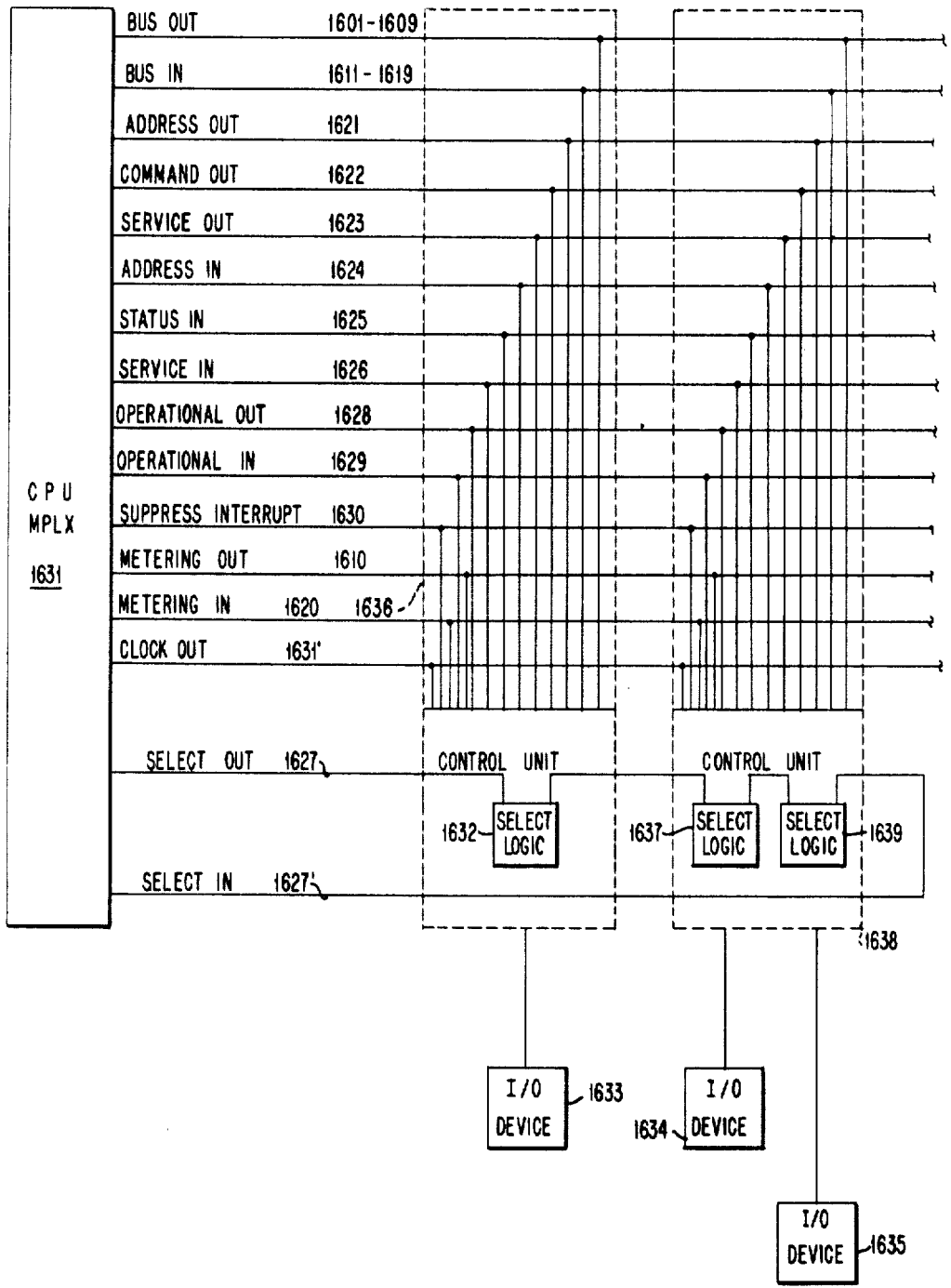
Figure 2A:
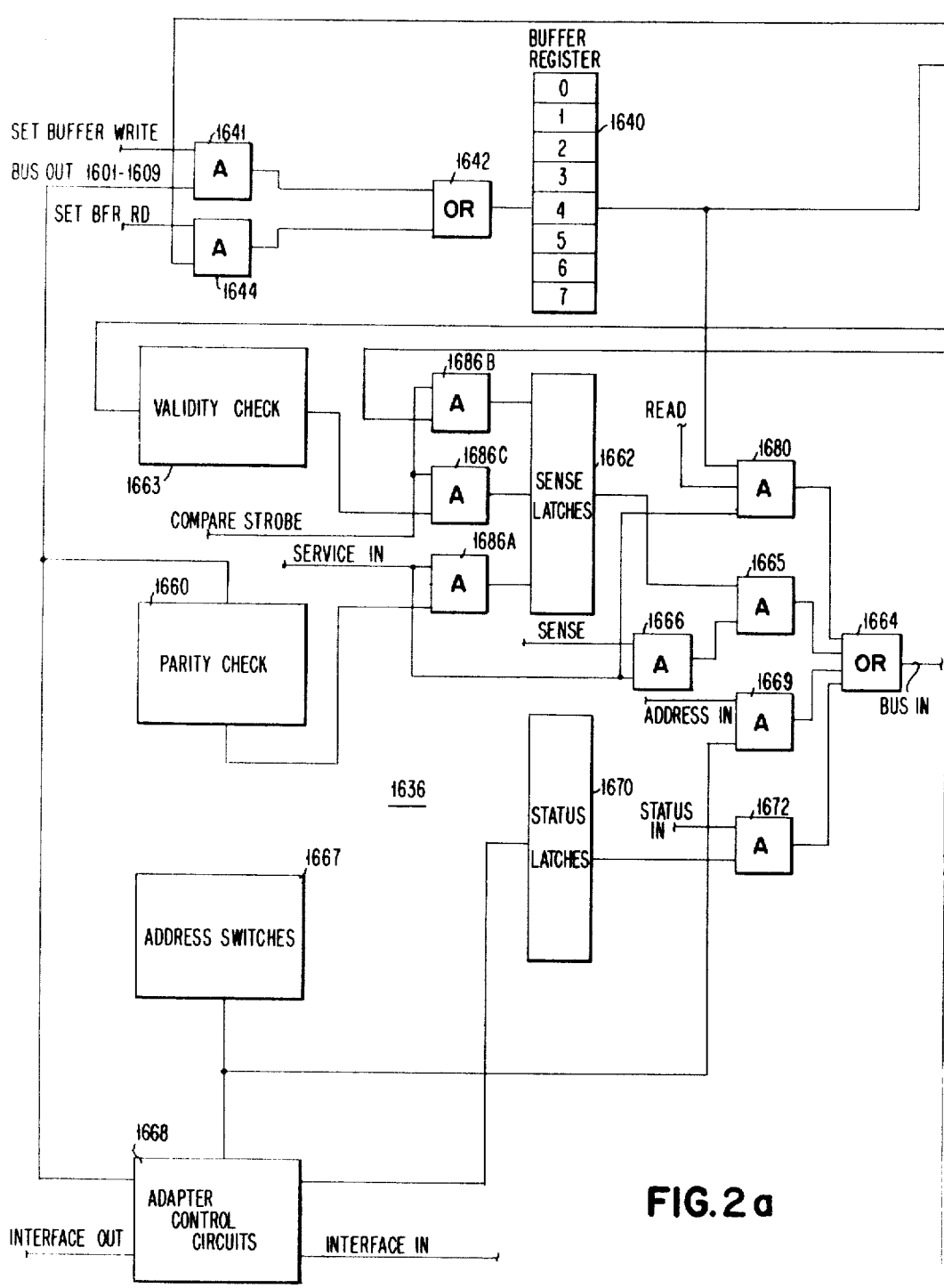
Figure 2B:
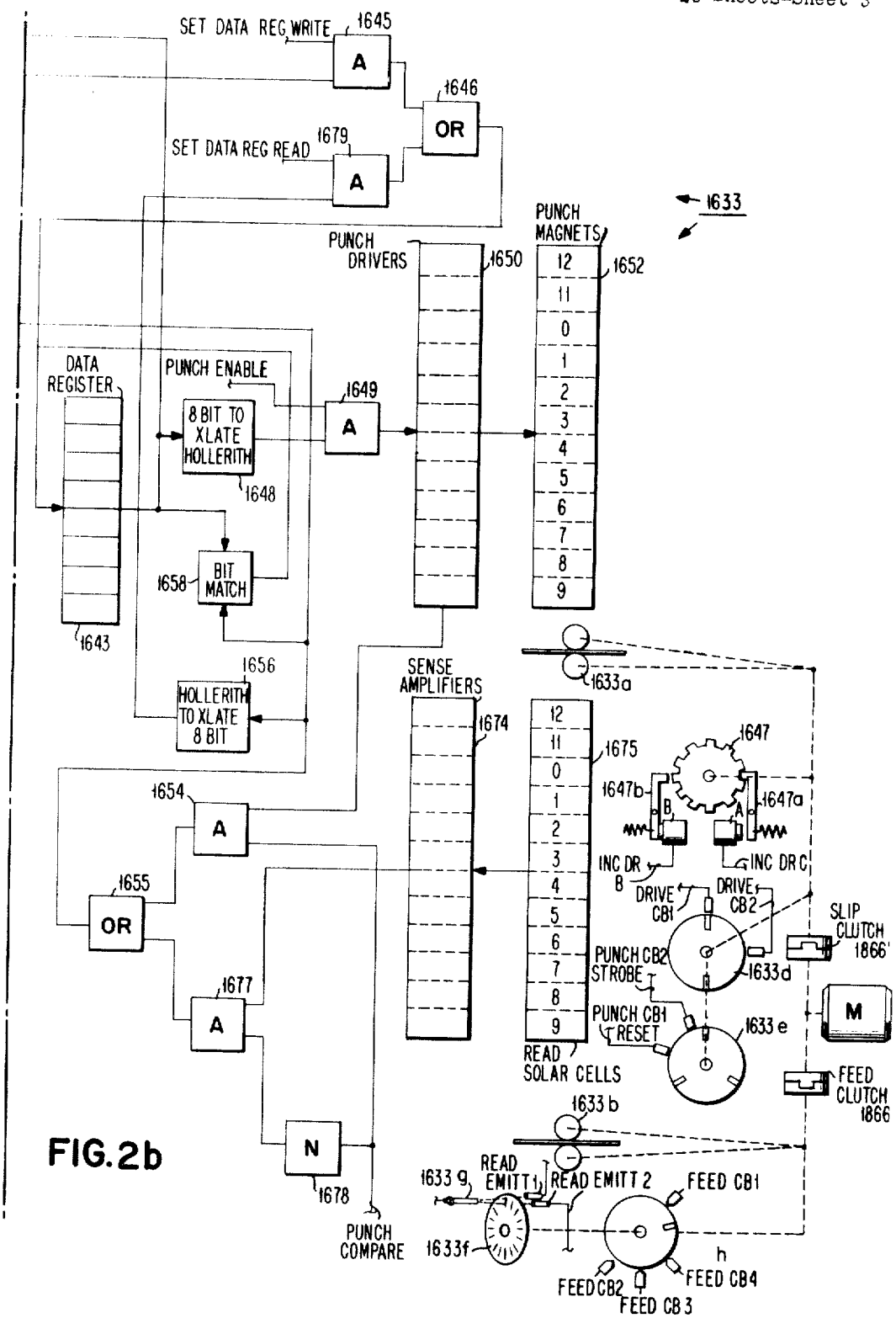
Figure 4A:
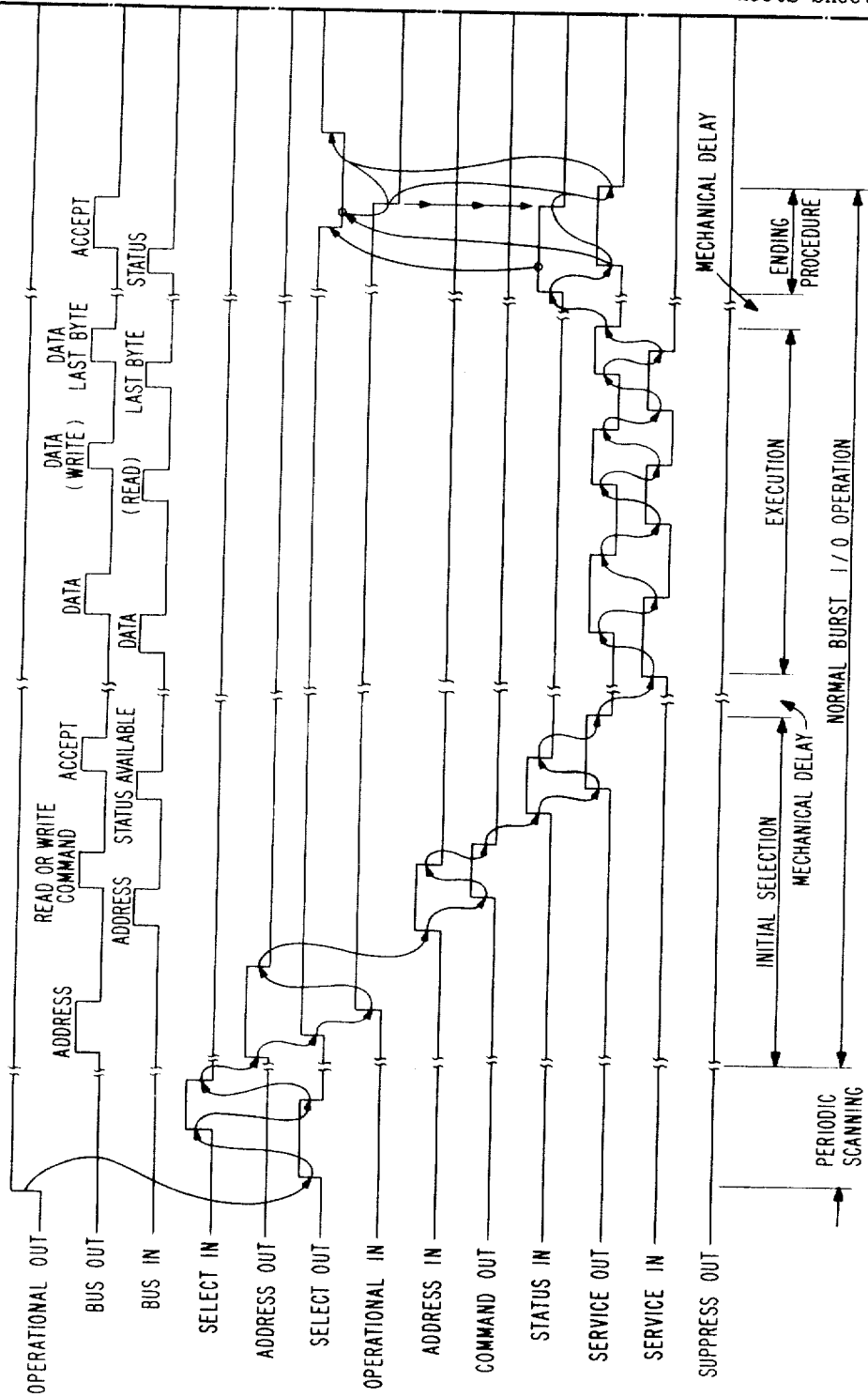
Figure 4B:
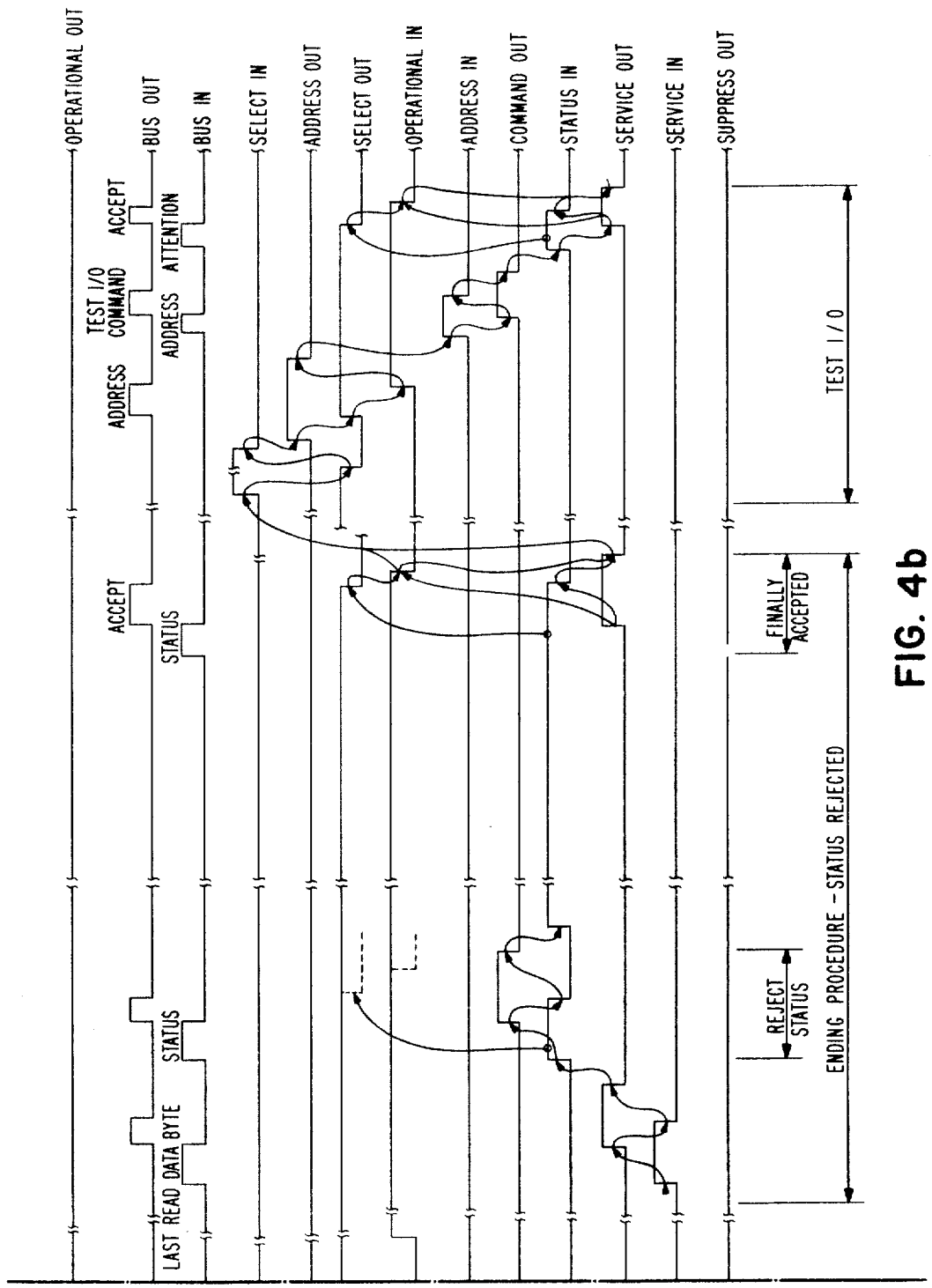
Figure 5A:
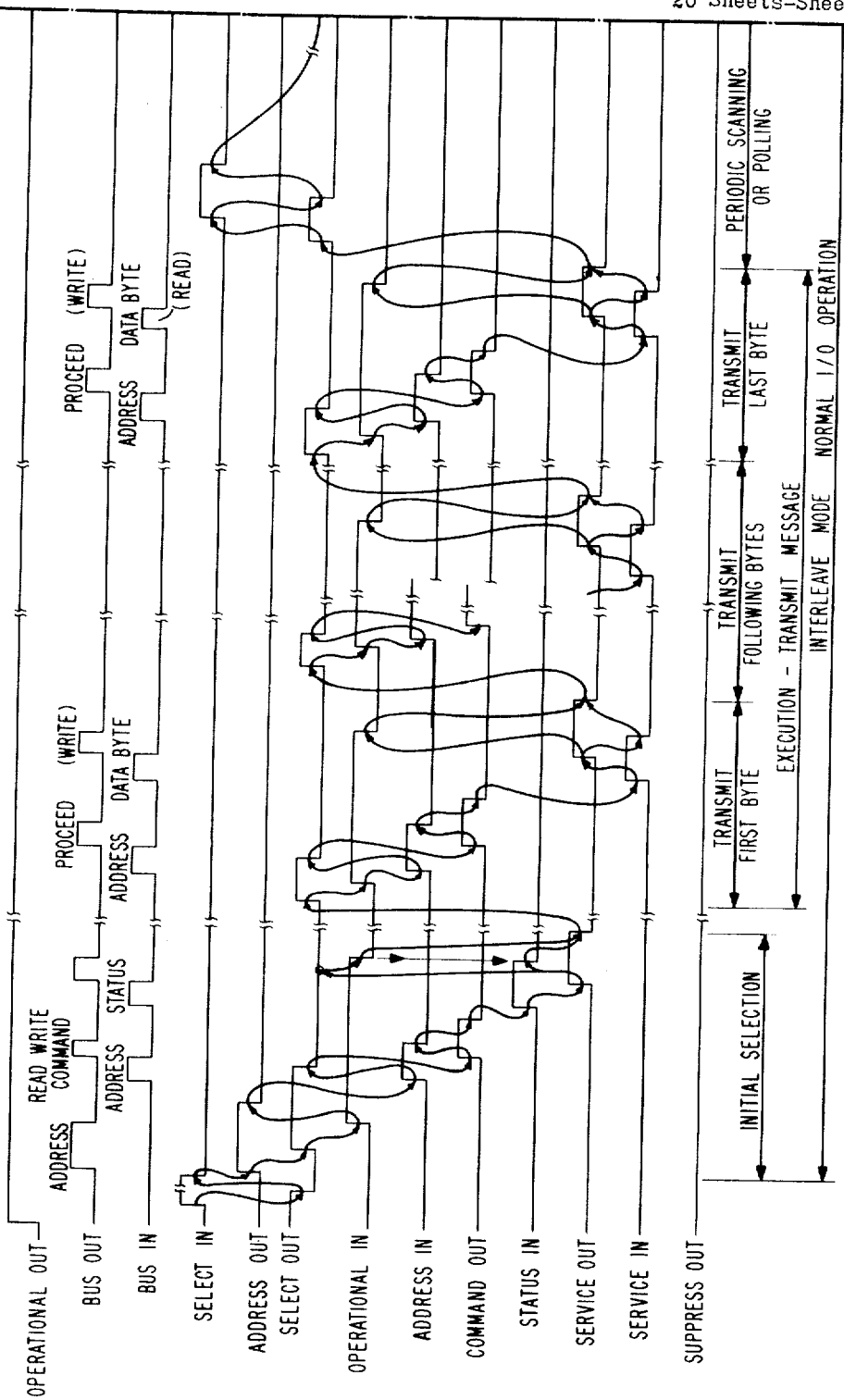

In the drawings:

FIG. 1 is a schematic block diagram of a computer system embodying the invention in one of its forms;

FIGS. 2a and 2b taken together form a schematic diagram of an I/O control unit and I/O device such as used in the system of FIG. 1;

FIG. 3 is a block diagram showing the arrangement of FIGS. 3a–3l;

FIGS. 3a–3l taken together as shown in FIG. 3 provide a schematic circuit diagram of the I/O control unit and I/O device of FIGS. 2a–2b;

FIGS. 4a and 4b together provide a timing chart of a typical burst operation of the I/O control device of FIGS. 2a–2b in the system of FIG. 1, and FIGS. 5a and 5b together provide a timing chart of a typical system operation in the interleave mode (byte multiplex).

*Multiplex channel operation at I/O control units*

Referring to FIGURE 1, the reference numeral 1631 designates generally the central processing unit (CPU) of a computer including a multiplex channel which may be connected by means of an interface comprising BUS OUT lines 1601–1609, BUS IN lines 1611–1619, ADDRESS OUT, COMMAND OUT and SERVICE OUT Tag lines 1621–1623, ADDRESS IN, STATUS IN and SERVICE IN Tag lines 1624–1626, SELECT OUT and SELECT IN lines 1627 and 1627', as well as INTERLOCK and SPECIAL CONTROL lines, OPERATIONAL OUT, OPERATIONAL IN and SUPPRESS INTERRUPT 1628–1630 to a plurality of I/O devices 1633, 1634 and 1635 through a single I/O control unit 1636 and a multiple I/O control unit 1638, respectively. The BUS OUT and BUS IN lines are used to transfer data between the CPU and the I/O units. The TAG lines transmit control signals. Metering Out and Metering In lines 1610 and 1620 connect the CPU and control units for time metering purposes. A Clock Out line 1631' is provided for controlling the control unit meter when the CPU is waiting or halted. The central processing unit 1631 is connected to the control units 1636 and 1638 by the SELECT OUT and SELECT IN lines 1627 and 1627' in a serial fashion, SELECT OUT 1627 being connected through logic circuitry of each of the control units in a series relation. The SELECT OUT line is pulsed periodically by the CPU for serially polling the I/O control units to select a specific one or permit one of the several I/O units to seize the channel in order of priority as determined by their proximity to the CPU.

Referring to FIGURES 2a–2b, details of the I/O control unit 1636 and portions of the circuitry of the I/O device 1633 control circuits are shown schematically in further detail. As shown, a plurality of BUS OUT lines in this instance nine, consisting of the 0 through 7 bit and P parity bit lines 1601 through 1609 comprise the BUS OUT line arriving at the I/O control unit 1636 from the central processing unit 1631. These BUS lines are connected to a buffer register 1640 through an OR circuit 1642 and AND circuit 1641 which is gated with a Set Buffer Write signal from a portion of the control unit circuitry as will be described hereinafter. Data from the buffer register 1640 is transferred to the several positions of a data register 1643 through AND circuits 1645 which are gated with a Set Data Register Write signal derived from the control unit circuitry for transferring the data to the data register through OR circuits 1646. From the data register 1643 data is transferred to an 8-bit to Hollerith translator 1648 and thence to AND circuits 1649 where it is gated by a Punch Enable Signal to punch drivers 1650 for operating selected ones of punch magnets 1652. By means of a punch echo circuit, drivers 1650 that are set are gated through AND circuits 1654 with a Punch Compare signal and through OR circuits 1655 to a Hollerith-to-8-bit translator 1656 for comparing the data punched with the data in the data register 1643 by means of a bit match or compare circuit 1658. A parity check circuit 1660 connected to the incoming OUT BUS lines 1601 to 1609 checks the data for parity and controls a latch in a plurality of sense latches 1662 through AND 1686A as does also a validity check circuit 1663 and the bit match checking circuit 1658 through AND 1686C and 1686B, respectively, for supplying indications of error conditions to BUS IN lines 1611–1619 in response to a Service In signal and Sense signal through AND circuits 1666 and 1665, through a Bus In OR circuit mix 1664.

A plurality of address switches 1667 are provided for designating the address of the particular I/O unit. These switches are connected to adapter control circuits 1668 for matching the address of the particular I/O device against the address supplied to the control circuits from the BUS OUT lines 1601–1609 in response to an address from the central processing unit. The address switches 1667 also supply the I/O address bits to the BUS IN lines through AND circuit 1669 in response to an Address In signal. The Interface Control lines Out, which include the Address Out, Command Out and Service Out tag lines 1621, 1622 and 1623, respectively, supply signals to the adapter control circuits from the central processing unit which, in turn, is supplied with signals from the I/O control unit over the interface control lines in, which includes the Address In, Status In and Service In tag lines 1624–1626. The adapter control circuits also supply signals for controlling a plurality of Status latches 1670 which are connected to the BUS IN lines through OR circuits 1664 and AND circuits 1672 for responding to a Status In gating signal. The I/O device, which, for the purpose of description may in the present instance by the IBM 1442 reader punch, is provided with a plurality of read solar cells 1675 for reading cards. The solar cells are connected to sense amplifiers 1674 and in response to a Read Command, supply data to the Hollerith to 8-bit translator 1656 through AND circuit 1677 and OR circuit 1655 gated by an inverted punch compare signal from inverter 1678. This data is supplied to the data register 1643 through OR circuit 1646 by way of AND circuit 1679 in which it is gated by a Set Data Register Read signal, and from whence it is supplied to the buffer register 1640 through AND 1644 and OR 1642, and thence through AND circuit 1680 and OR 1664 to the BUS IN lines.

The particular structure of the reader punch I/O device 1633 does not form a part of the present invention, and is shown schematically only, in order to provide data input and/or output and furnish the necessary electrical signals used in the I/O circuitry. For example, feed rolls 1633a are shown having a driven connection with a motor M for feeding a card C past a punch station represented by the punch magnets 1652. To provide an incremental column by column drive, a ratchet or detent wheel 1647 is provided having pawls 1647a and b which are released alternately by incremental drive magnets 1633A and 1633B. Drive CB1 and CB2 signals are developed by a magnetic emitter 1633d having read heads CB1 and CB2 and driven by the same drive as feed rolls. Punch strobe CB1 and Reset Punch CB2 signals are developed by a magnetic emitter 1633e.

The read station represented by solar cells 1675 has associated feed rolls 1633b connected to motor M through a feed clutch 1866 for feeding a card C past the read station. While the feed rolls 1633a and b are shown at separate locations, it will be realized that they may be parts of a common card feed for feeding a card C first past the read station and then past the punch station. A read emitter comprising a slotted disc 1633f in combination with a light source 1633g and solar cell pickups Rd Emit 1 and Rd Emit 2 are provided for controlling reading operations. Also provided is a magnetic emitter 1633h having signal pickups FdCB1; FdCB4 for controlling the feed clutch.

Referring to FIGURE 3, it will be seen that FIGS. 3a–3l arranged together as shown in FIG. 3 provide a schematic diagram of the control unit adapter control circuits and I/O device circuits of FIGS. 2a and 2b. As therein shown, the buffer register 1640 (FIG. 3a) is a single column buffer and comprises a plurality of bit latches 1640A through 1640I of which only 1640A, 1640D–F and 1640I are shown as representative. These latches are set through corresponding OR circuits 1642A–I which only 1642A, D–F and 1642I are shown by way of illustration. The nine BUS OUT lines 1601 through 1609 including the 0 through 7 bit and the parity bit P are respectively connected to the OR circuits 1642A through 1642I through AND circuits 1641A through 2641I, of which only 1641A, D–F and 1641I are shown. The bits from the BUS OUT lines are gated in these AND circuits with a Set Buffer Write signal derived from the adapter circuitry as explained hereinafter. The latches 1640A through 1640I are likewise disposed to be set through OR circuits 1642A to 1642I by means of a plurality of AND circuits 1644A to 1644I for gating information from the data register 1643 to the BUS IN lines through the buffer register 1640 during a read operation, the bits from the data register each being gated with a Set Buffer Read signal. The outputs from the buffer latches 1640A to 1640I are gated to the BUS IN lines 1611 to 1619 through AND circuits 1680A through 1680I in conjunction with a read signal and a Service In signal.

The outputs of the buffer register latches 1640A through 1640I are supplied to the data register latches 1643A through 1643I through AND circuits 1645A through 1645I respectively, being gated with a Set Data Register Write signal. OR circuits 1646A through 1646I are utilized as a mix for the outputs of AND circuits 1645A to 1645I and the outputs of AND circuits 1679A through 1679I which are gated with a Set Data Register Read signal.

The output of data register latch 1643A produces the

Data Register φ bit and is connected to AND circuit 1649A in conjunction with a Punch Enable signal to operate the 12 punch magnet 1652A. Latches 1643B and 1643C (not shown) are connected similarly to produce Data Register 1 and 2 bits, and operate the 11 and φ punch magnets (not shown). The output of data register latch 1643I is gated through AND circuit 1649I for producing the Data Register P parity bit. The 8 and 9 punch magnets (not shown) are operated from the latches 1643G and 1643H (not shown) while the 1 through 7 punch magnets are selectively operated from the latches 1643D through F through an 8-bit to Hollerith code translator 1648 with the 1 punch magnet being, for example, operated from the 3 bit output of latch D, inverted or $\bar{4}$ output of latch E, and the inverted or $\bar{5}$ output of latch F through AND decode circuit 1648A. The other or 2 through 7 magnets are similarly connected.

The twelve sense lines from the read solar cells 1675A through L (FIG. 3b) are connected through sense amplifiers 1674A–1674L, AND circuits 1677A through 1677L and OR circuits 1655A through 1655L to their respective sense lines which go to the Hollerith to 8-bit translator 1656. The sense lines 12, 11, φ, 9, and 8 provide the φ, 1, 2, 7 and 6 bits while sense lines 1 through 7 provide the 3, 4 and 5 bit lines through OR circuits 1656A through 1656C. AND circuits 1656D through 1656F provide an invalid card code signal through AND circuits 1663A to C and OR circuit 1661.

An address match circuit is provided (FIG. 3i) for comparing an I/O Control Unit address on the BUS OUT lines with the unit address switches 1667 by connecting the eight bit φ–bit 7 BUS OUT lines 1601 to 1609 to a plurality of Exclusive-OR circuits 1681A through 1681F in conjunction with connections from a plurality of address switches 1667A through 1667H. The outputs of the Exclusive-OR circuits 1681A to 1681H are ORed in an OR circuit 1683 which, in conjunction with an inverter 1684, provides an Address Match signal and a $\overline{\text{Address Match}}$ signal.

The parity check circuit 1660 comprises a plurality of Exclusive-OR circuits 1660A through D which are connected to the 0–1, 2–3, 4–5, and 6–7 bit lines respectively. The outputs of the Exclusive-OR circuits 1660A and 1660B are connected to an Exclusive-OR circuit 1660E, and the outputs of Exclusive-OR circuits 1660C and 1660D are connected to associated Exclusive-OR circuit 1660F, the outputs of which are connected to an additional Exclusive-OR circuit 1660G. The output of this OR circuit is gated to an Exclusive-OR circuit 1660H with the parity bit P to provide an odd parity indication. Inverter 1661 provides an even parity signal.

A plurality of sense latches 1662A through 1662E (FIG. 3f) are provided for applying to the BUS IN lines 1611–1619 through AND circuits 1665A through 1665E bit signals indicative of error conditions of the I/O device in conjunction with a gating signal from AND circuit 1666 which is responsive to a Service In signal and a Sense signal. Latch 1662A is a Parity Error latch and is set by a signal from AND circuit 1686A having as inputs, an Even Parity signal, a Service In signal and a Service Out delayed signal. Sense latch 1662B is a compare error latch and is set by a signal from AND circuit 1686B which is gated by a compare error from the bit check circuit 1658 and a compare strobe signal.

The check circuit 1658 comprises a plurality of AND circuits 1658A–N of which only 1658A–B are shown as typical. The Data Register 2 and Row Sense 4 are compared in 1658A and the $\overline{\text{Row}}$ 2 and Data Register 4 bit in 1658B. The outputs of all the AND circuits are ORed in OR 1659.

Latch 1662C is an Invalid Card Code latch and is set a signal from AND circuit 1686C whose inputs comprise an Invalid Card Code signal from OR circuit 1661 and a Compare Strobe signal. Latch 1662D is an Overrun latch and is set through an OR circuit 1687 by signals from any one of a plurality of AND circuits 1688, 1689, and 1690 in response to an overrun condition of the I/O device. Latch 1662E is an invalid command sense latch and is set by an invalid command status signal.

The status latches 1670 comprise a plurality of latches 1670A through 1670F (FIG. 3h) which are connected through AND circuits 1672A, B and D through F to the BUS IN lines 1611 through 1619 for providing to the channel an indication of the condition of the machine or the I/O unit. Latch 1670A is an end received latch which is used to block the END signals from Channel END latch 1670B. The end received latch 1670A is set through AND circuit 1691 in response to Status In, Service Out, $\overline{\text{busy}}$ and End signals. The END latch 1670B is set through AND circuit 1692 in response to a $\overline{\text{Status In}}$ signal and the output from OR circuit 1693 which responds to the inputs from either of AND circuits 1694 and 1695. AND circuit 1694 responds to Stop and $\overline{\text{Write}}$ Latch signals while AND 1695 responds to Punch End Sequence and $\overline{\text{Status}}$ In signals. Status latch 1670C is a Unit Free latch which indicates the unit is free or that the I/O device has reached the end of its operation. The output of the latch is applied to the 5-bit line of BUS IN through AND circuit 1672B in conjunction with Status In. A busy status signal is applied to the 3-bit line of BUS IN through AND circuit 1672C from an OR circuit 1697 having inputs from AND circuits 1698A, B and C. OR circuit 1698' provides one input to each of these AND circuits.

Status latch 1670D is an invalid Command or Unit Check status latch and applies its output to the BUS IN bit 6 line through AND circuit 1672D by way of an OR circuit 1699. Latch 1670D is turned on in response to an Invalid Command signal. Status latch 1670E is a Data Check latch which applies its output to the 2-bit BUS IN line through AND circuit 1672E. This latch is set by a single shot or monostable multivibrator 1702 in response to signals from an OR circuit 1703, having as inputs the following signals: Overrun, Invalid Card Code, bit check and Parity. Status latch 1670F is an Exceptional Condition status latch which is gated to the 7-bit BUS IN line through AND circuit 1672F. This latch is set by signals from AND circuit 1705 in response to CB–1, Last Card, and Read or End signals and is reset by the output of an OR circuit 1706, in response to Reset 1 signal or the output of AND circuit 1707, having as its inputs Service Out, Status In, and $\overline{\text{Busy}}$ signals.

Control of the I/O unit is affected through a plurality of Command latches (FIG. 3g) forming part of the circuitry in the adapter control circuits 1568 and they are as follows: latch 1710A is a Read latch which is set by the output from a decode AND circuit 1711A in response to a Command signal from the BUS OUT lines comprising a 5, 6 and $\bar{7}$ together with an input from AND circuit 1712 having as its inputs the following signals: $\overline{\text{Command}}$ Interlock, Odd Parity, Command Out delayed, Address In, Ready and Address Match latch. The output of the Read latch 1710A is gated through AND circuit 1714A with a Command Interlock signal to provide a Read signal. Latch 1710B is a Write latch which is set by the output of a decode AND circuit 1711B in response to inputs from the 5, $\bar{6}$, and 7 BUS OUT lines, together with the output of AND circuit 1712. The output of the Write latch is ANDed in AND circuit 1714B with Command Interlock signal to provide an output Write signal. Command latch 1710C is a Sense latch which is gated from a decode AND circuit 1711C responsive to the 5, $\bar{2}$, $\bar{3}$, $\bar{4}$, $\bar{6}$, and $\bar{7}$ bits gated with the output of AND 1712, and whose output is gated through an AND circuit 1714C with Command Interlock to provide a Sense output signal. Latch 1710D is a Control latch which is gated from AND circuit 1711B in response to the 6 and 7 bits and the output of AND 1712, and whose output is gated through AND circuit 1714D with Command Interlock to provide a Control signal. OR circuit 1718 provides a Command Stored signal in response to inputs from any of the Read, Write, Sense and Control latches. Command latch 1710E is a Test I/O latch which provides a test I/O signal in response to a signal from AND circuit 1720, which gates the input signals, Address In, Command Out delayed, Address Match latch and the output from an AND circuit 1721 having as inputs inverted signals from each of the BUS OUT bit lines together with the parity bit P.

Referring to FIGURE 3j, it will be seen that the Select Out tag line 1627, which is used to poll the I/O devices to either permit the channel to select one or permit one of the I/O devices to take over the channel, is connected to a suitable line receiver and then to a delay device 1724 to provide a Select Out delayed signal which goes to an AND circuit 1725, the output of which is connected to a suitable line driver, the output of which is connected to the Select Out tag line 1627A which continues to the next I/O device and so on until the last I/O unit from which the circuit is completed back to the CPU by Select In 1627. The other inputs of the AND device 1725 are the $\overline{\text{request}}$ latch signal, the inverted output of AND circuit 1727 which is inverted by inverter 1728, the inputs to the AND circuit 1727 being an Address Match signal, and the output of a line receiver to which is connected the Address Out tag line 1621. The output of the AND circuit 1727 is also used to gate an Address Match latch 1730 in conjunction with the Select Out delayed set signal. The output of the Address Match latch is gated in an AND circuit 1731 with Select Out and Select Out delayed, and thence through an OR circuit 1732, to set an Operational In latch 1734 which is reset through OR circuit 1735 in response to a Reset signal or the output of an AND circuit 1736. The ON output of the Operational In latch 1724 is directed to a line driver and then to the Operational In line 1629 (FIG. 3l). The off output is used to gate the input to select out line 1627 through AND circuit 1725 (FIG. 3j), thus dropping the Select Out line beyond the particular I/O if the Operational In latch is set in response to an Address Match, and preventing any other I/O unit from seizing the channel. The output of the Operational In latch 1734 is also connected to AND circuit 1738 and through a delay device 1739 to a line driver connected to the Address In Tag line 1624 (FIG. 3l).

One of the said inputs to the Operational In latch 1724 comes from a (FIG. 3j) Request latch 1740 through AND circuit 1741 and OR 1732. The request latch is set. The Request latch 1740 is connected to be set through an OR circuit 1742 in response to the output of an AND circuit 1743 having as its inputs the following signals: Address Match, Status In, Service Out, $\overline{\text{Test}}$, I/O, $\overline{\text{Busy}}$, and $\overline{\text{Interrupt or Request}}$. The other input to the OR circuit 1742 comes from an AND circuit 1744 having as its input an output of an OR circuit 1746, which is controlled by Interrupt or Request, or Service Request signals. The Service Request signal is generated from an OR circuit 1747, in response to the output of an AND circuit 1748 having as its inputs a Buffer Full and Read signals, or the output of an AND circuit 1749 having as its input $\overline{\text{Buffer Full}}$ and the output of OR circuit 1750, which mixes Control, Write and Sense signals. The other input to OR circuit 1746 comes from OR circuit 1751 which mixes signals from AND circuit 1752, the inputs of which are END, $\overline{\text{End}}$ Received and $\overline{\text{Queued}}$. Another input to the OR circuit 1751 comes from AND circuit 1753, the inputs of which are the $\overline{\text{Suppress}}$ Interrupt signal from Suppress Interrupt Interlock line 1630 through inverter 1755 and the Queued signal. Still another input to the AND circuit 1751 comes from AND circuit 1757, the inputs of which are Queued and Unit Free. The Request latch 1740 is reset by the output from an OR circuit 1759 whose inputs are Reset, Address Out, the output of AND circuit 1760, and the output of AND circuit 1761, i.e., $\overline{\text{Select}}$ Out, S-In Tag Latch and the output of OR circuit 1756 (inputs Address Match Latch and Command Interlock), and $\overline{\text{Op}}$ In, $\overline{\text{Select}}$ Out and $\overline{\text{Service}}$ Request, respectively.

A Status In latch 1763 (FIG. 3l) applies a Status In signal to the Status In tag line 1625 through a delay device 1764 and AND circuit 1765 which is gated with the Operational In latch output. The Status In latch 1763 is set by the output of an OR circuit 1767 to which signals are provided from AND circuits 1768 and 1769. AND circuit 1768 has as inputs the Address Match latch output, the $\overline{\text{Status}}$ In tag latch, and the output from an AND circuit 1770 whose inputs are the outputs of a Proceed latch 1772 (FIG. 3k) and the $\overline{\text{Command}}$ Out and $\overline{\text{Service}}$ Out signals derived from the Command Out tag line 1622 and the Service Out tag lines 1623, respectively, through inverters 1774 and 1775. These tag line signals are supplied to the inverters through AND circuits 1776 and 1777, which are gated with the Operational In signal; namely, the output of the Operational In latch 1734. The Proceed latch 1772 is reset by a $\overline{\text{Operational}}$ In signal, and is set by the delay Command Out signal from AND circuit 1776 through delay devices 1779 and 1780. The Status In latch 1763 is reset by the output of an OR circuit 1782 which has as its inputs the $\overline{\text{Operational}}$ In signal and the Service Out and Command Out delayed signals derived from an OR circuit 1784, the Service Out delay signal being delayed by delay device 1785. The Service In line 1626 is supplied through its line driver from AND circuit 1786 which gates the output of the Operational In latch 1734 with the output of a Service In latch 1788 through a delay device 1789. The Service In latch 1788 is set by the output from an AND circuit 1790 which gates the Service Request signal with the output from an AND circuit 1791, the inputs of which are Request latch, $\overline{\text{Address}}$ Match latch, and the output of the AND circuit 1770. The Service In latch is reset by the output from an OR circuit 1792 whose inputs are the $\overline{\text{Operational}}$ In signal and the output of an AND circuit 1793, which gates the Service Out and Command Out delay signal from OR circuit 1784 with the $\overline{\text{Service Request}}$ signal from inverter 1795. A Status In tag latch 1796 (FIG. 3l) is set by the output from an OR circuit 1797, which includes as inputs the Status In delayed from delay device 1764 and Service In delayed from delay device 1789, and is reset by a $\overline{\text{Operational}}$ In signal. This latch provides one input to Gated S-In Tag AND circuit 1798, the other inputs being $\overline{\text{Command}}$ Out, $\overline{\text{Service}}$ Out and $\overline{\text{Status}}$ In.

A Stop latch 1800 (FIG. 3k) is provided for producing a Stop signal used in the adapter circuitry. This latch is set by the outputs from an OR circuit 1802 having as its inputs the output of an AND circuit 1803 which gates the Control or Sense signal with a Buffer Full signal, and AND circuit 1804 which gates Service In with Command Out, and AND circuit 1805 which gates Read operation with feed circuit breaker CB2 single shot. Stop latch 1800 is reset by the output from an OR circuit 1806 whose inputs are Reset 1 and $\overline{\text{Command}}$ Stored. A Queued latch 1808 provides a signal for holding operation of the I/O device if the channel is not ready. This latch is set by the output from an AND circuit 1810 whose inputs are Command Out and Status In. The latch 1808 is reset by the output from an OR circuit 1812 whose inputs are Reset 1 and the output of an AND circuit 1813, the inputs of which are Service Out, $\overline{\text{Busy}}$ and Status In. A Command Interlock latch 1815 is provided for producing the Command Interlock signal being set by the output from an AND circuit 1816 whose inputs are Gated, Status In Tag, Request latch and Address Match latch. This latch is reset by the output from an OR circuit 1818 whose inputs are Reset 1 and the output of an AND circuit which gates Unit Free, Status In, Service Out and $\overline{\text{Busy}}$, this AND circuit being designated 1819.

A Buffer Full latch 1820 (FIG. 3c) is provided for producing a signal to indicate that the Buffer Register 1640 is full. This latch is set by the out of a $\overline{\text{Set}}$ buffer Write 2 μsec. single shot or monostable multivibrator 1823 which is activated through inverter 1822 on the fall of a 4 μsec. Set Buffer single shot 1821. The Set Buffer single shot 1821 is operated from a 2 μsec. Reset Buffer single shot or monostable multivibrator 1824 whose input is derived from an OR circuit 1825. A Set Buffer Read signal is provided by AND 1817 which gates the Read signal with the output of single shot 1821. The input to the OR circuit 1825 is the output from an AND circuit 1826 whose inputs are Write, Control or Sense, Service In, and Service Out delayed and Command Out delayed. Another AND circuit 1827 provides an input to OR circuit 1825, the inputs to the AND circuit being $\overline{\text{Overrun}}$, $\overline{\text{Buffer}}$ Full, Data Register Full, Read and $\overline{\text{Service}}$ In. The Buffer Full latch 1820 is reset by the output from an OR circuit 1828, the inputs of which are $\overline{\text{Command}}$ Stored, the output of an AND circuit 1829 whose inputs are Read, Service Out and Service In; the input from an AND circuit 1830 whose inputs are Write, $\overline{\text{Set}}$ Data Register Write single shot, and $\overline{\text{Stop}}$; another input to the OR circuit 1828 is the output of an AND circuit 1831 whose inputs are Read, Service In, and Command Out.

The I/O device includes a Data Register Full Read latch 1833 (FIG. 3d) which is set by the output from an AND circuit 1836 which gives the Read signal, $\overline{\text{Stop}}$ and a Compare Strobe signal. This latch is reset by the output from an OR circuit 1837, whose inputs are $\overline{\text{Command}}$ Stored, $\overline{\text{Set}}$ Buffer single shot, and the output of an AND circuit 1838 whose inputs are Read, Service In and Command Out. The Compare Strobe signal is produced by a 2 μsec. single shot or monostable multivibrator 1840 from the output of an OR circuit 1841, the inputs of which are the gated output of the Read Emit 2 signal from the machine, a $\overline{\text{Stop}}$ and a Read signal gated at AND circuit 1842. The other input comprises the output of an AND circuit 1843 one of whose inputs is the output of a Punch Compare latch 1844 which is set by the output from an AND circuit 1846, which includes signals from a Punch circuit breaker Punch CB2 connected to the machine and the output from an OR circuit 1847 whose inputs are Incremental drive A, Incremental drive B and the gated Punch End Sequence and Punch Compare signals from an AND circuit 1848. The Punch Compare latch is reset by the output of an OR circuit 1849 in response to a $\overline{\text{Command}}$ Stored signal or the Punch End Sequence signal. A Punch Enable Control latch 1845 is set by the signal from an AND circuit 1845', which gates the $\overline{\text{Stop}}$ signal and a $\overline{\text{Set}}$ Data Register Write single shot signal from single shot 1854 through inverter 1855 from the Set Data Register Write signal. Latch 1845 is reset from OR 1862 by Reset or Punch CB2. A Punch End Sequence latch 1852 is set by the output from an AND circuit 1853 which gates the Stop signal with the output of the $\overline{\text{Set}}$ Data Register Write single shot or multistable multivibrator 1854, which is activated through inverter 1855 from AND circuit 1856. One of the inputs to AND circuits 1856 is the output of OR circuit 1847, another is the output of a Set Data Register single shot 1857 derived from the output of Reset Data Register single shot 1858. The input to Reset Data Register single shot 1858 is the output of OR circuit 1859, the inputs are the *inverted* signal from AND circuit 1860 which gates the Read signal with the Read Emit 1 signal from the machine, another input to the OR 1859 is the delayed output of AND circuit 1861 through delay 1859', which gates the output of punch circuit breaker Punch CB1 from CB11862 with the output of OR circuit 1847. The output from the single shot 1857 is ANDed in AND circuit 1863 with the Read signal and the output of OR 1847 to provide the Set Data Register Read signal.

Operation of the feed for the reader punch is controlled by a Feed Clutch 1866 (FIG. 3e). This operates under the control of a Feed Clutch latch 1867, which is set by the output from an OR circuit 1886, AND circuit 1868 which gates the Write signal with the output of a Feed Interlock latch 1869 which is set by the feed circuit breaker Feed CB1 and reset by the feed circuit breaker Feed CB4. Another input to AND circuit 1868 comes from the off side of the Card in Punch Station latch 1870 which is set by a punch card lever and is reset by the output from the feed circuit breaker Feed CB2. Another input to AND circuit 1868 is the output of a Ready latch 1872 which is set by the output of a Run latch 1873 gated in an AND circuit 1874 with the output of an OR circuit 1875 whose inputs are machine signals indicating Card In Read station and Last card. The Ready latch 1872 is reset by the off output of the Run latch 1873 through AND circuit 1876 where it is gated with the $\overline{\text{Command}}$ Interlock and the $\overline{\text{Operational}}$ In signal, then through OR circuit 1877, whose other input is Reset. The Run latch 1873 is responsive to machine conditions and may be represented as being turned on by a Start key in connection with other card conditions if desired, and turned off by a Stop key.

When a punching operation is being performed the machine drive is controlled by incremental drive magnets A and B 1878 and 1879 respectively through A and B latches 1880 and 1881. The latch 1880 is set by pulses from a drive circuit breaker Drive CB1 gated through AND circuit 1882 with the output of an AND circuit 1883 in which are gated $\overline{\text{Delay}}$ Start, $\overline{\text{Feed}}$ Interlock, Card In Punch Station, $\overline{\text{Punch}}$ End Sequence, Write, and Buffer Full, Incremental Drive A and Incremental Drive B through OR circuit 1884. The Incremental Drive latch B1881 is set by pulses from the drive circuit breaker Drive CB2 gated with the output of the AND circuit 1883. Both latches are reset by the output from an OR circuit 1885 whose inputs are $\overline{\text{Command}}$ Stored and Punch End Sequence, or from the output of an AND circuit 1887 whose inputs are $\overline{\text{Buffer}}$ Full and Compare Strobe.

In the operation of an I/O device from the central processing unit, two modes of operation are available, the mode being determined by the interface channel which selects one of two modes: (1) Burst or (2) Data Interleave. Burst mode allows the device to remain attached to the interface channel for selection and transmission of a relatively large amount of data. Data Interleave mode allows the I/O device to utilize the channel for selection and transmission of small amounts of data, this operation being interleaved with similar operations of I/O devices. Before any card operation can be performed by the reader punch, the operation of which is hereinafter described as typical of any I/O device, the initial run-in must take place, which means that the machine is in the Ready condition with a card entering the read station. If the first operation calls for punching, the feed cycle will automatically occur which positions the card in the punch station.

*Burst mode—Write Command*

In the Burst mode a Write Command will cause the card to enter the punch station and be transported by the incremental drive. Starting with the first column, byte after byte will be transferred from the interface BUS OUT lines, decoded into 12-bit code and then punched. After punching, the card will be ejected into a stacker (assuming an eject modifier has been given with the punch command). To initiate the Write operation, the channel places the address of the I/O device on the BUS OUT lines 1601–1609 and then raises the Address Out line 1621. The address bits are matched in the Address Match circuit 1681 (FIG. 3*i*) through Exclusive OR 1681A–1681H with the corresponding address switches 1667-0 through 1667-7, a different combination of these switches designating the address of each unit. If the bits match, there will be no input to the OR circuit 1683 and the inverter 1684 will produce an address match signal. This Address Match signal is applied to AND circuit 1727 with the Address Out signal from Address Out tag line 1621 and sets the Address Match latch 1730 (FIG. 3*j*) upon the occurrence of the next Select Out signal when the I/O device is polled as it is periodically by the channel. The Address Match latch 1730 is set and the output from the Address Match latch is applied to Operational In latch 1734 through AND circuit 1731 together with the Select Out signal and the Select Out delay signal to provide an output to the OR circuit 1732 to set the Operational In latch. The output of the Operational In latch 1734 is applied to the Operational In line 1629. The rise of Operational In allows the channel to drop Address Out at the central processing unit. The fall of Address Out causes the rise of Address In, the $\overline{\text{Address}}$ Out signal being gated in AND circuit 1738 (FIG. 3*l*) with $\overline{\text{Proceed}}$ and with the output of the Operational In latch 1734. Address In gates the output of the closed I/O address switches 1667-2 and 1667-4, for example, in AND circuits 1669A through 1669H (FIG. 3*i*) to the BUS IN mix or circuit 1664. After the channel has checked the address, it responds by placing the Write Command byte ($\overline{6}$, 7) on the BUS OUT and then raises the Command Out line 1622. Command Out is applied to the Proceed latch 1772 through AND circuit 1776 where it is ANDed with Operational In, and delay circuits 1779 and 1780 to set the Proceed latch (FIG. 3*k*); the Proceed latch 1772 turning on causes the fall of Address In by removing the $\overline{\text{Proceed}}$ signal from AND circuit 1738. The Command bits received over the BUS OUT line are checked for parity in the Exclusive ORs 1660A–1660H of parity checking circuit 1660 (FIG. 3*i*), and if odd parity is detected, the Command latch gate AND circuit 1712 (FIG. 3*g*) is set when Command Out delayed signal from delay device 1779 rises. The Command latch gate and the Command bits set the particular Command latch, in this case the Write Command latch 1710B, it being assumed that the $\overline{6}$ bit and 7 bit were received. The output of the Command latch is applied to the OR circuit 1718 and also produces a Command Stored signal.

The Address In signal going on causes the channel to drop Command Out. When Command Out falls, the Status In latch 1763 (FIG. 3*l*) is set through OR 1767 from AND 1768, $\overline{\text{Command}}$ Out, from AND circuit 1770 providing one input to the AND circuit 1768, the other inputs being provided by the output from the Address Match latch 1730 and the $\overline{\text{Status}}$ In Tag latch from latch 1796. The I/O unit then places the Status byte on the BUS IN lines bit 1611 through 1619 (FIG. 3*h*), which in the present situation will be all zeroes, indicating that the Command was accepted. The channel then responds with the Service Out signal. Service Out is applied to the Status In latch 1763 (FIG. 3*l*) through AND 1777, delay device 1785, OR circuit 1784 and OR circuit 1782 resetting the Status In latch 1763. This complete the initial selection. When Service Out rises, the Request latch 1740 (FIG. 3*j*) is set by the output of AND circuit 1743 which gates $\overline{\text{Test}}$ I/O, $\overline{\text{Intervention}}$ Required, Status In latch (before reset), $\overline{\text{Unit}}$ Busy, Address Match latch, and Service Out, the output of AND circuit 1743 being applied to the Request latch 1740 through OR circuit 1742. Status In delayed sets the Status In tag latch 1796 through OR circuit 1797; when Service Out falls in response to Status In falling, gated Status In Tag is up, the output of Status In Tag latch being gated with $\overline{\text{Command}}$ Out, $\overline{\text{Service}}$ Out and $\overline{\text{Status}}$ In through AND circuit 1798.

Gated Status In tag with Request latch and Address Match latch set the Command Interlock latch 1815 through AND circuit 1816 (FIG. 3*k*); Command Interlock with gated Status In and Select Out delayed from delay 1724 turns off the Address Match latch 1730 (FIG. 3*j*) through AND circuit 1733 and OR circuit 1737; Command Interlock along with Write latch 1710B (FIG. 3*g*) produces an output from AND circuit 1714B and produces the Write signal; Write and $\overline{\text{Buffer}}$ Full from 1820 produce Service Request signal at OR circuit 1747 (FIG. 3*j*) through AND circuit 1749 and OR circuit 1750. The rise of Service Request signal sets the Service In latch 1788 (FIG. 3*l*) through AND circuit 1790 where it is gated with the output from AND circuit 1791, (Service Request, Request latch, $\overline{\text{Command}}$ Out and $\overline{\text{Address}}$ Match latch all being on).

Service In latch 1788 output being applied to Service In Tag line 1626 through delay device 1789 and AND circuit 1786 signals to the channel that the I/O device is ready to receive a byte of information. The response of the channel to Service In during the Write operation is Service Out with the byte of information on BUS OUT.

Service Out delayed, Service In and Write turn on the Reset Buffer single shot 1824 (FIG. 3*c*) through AND circuit 1826 and OR circuit 1825, and this, in turn, turns on the Set Buffer Write single shot 1821. The latches 1640A through 1640I of the Buffer Register (FIG. 43*a*) are set by the Set Buffer Write signal, the bits from the BUS OUT line being applied to the buffer gate AND circuits 1641A through 1641I. Set Buffer Write going off sets the Buffer Full latch 1820 through inverter 1822 and $\overline{\text{Set}}$ Buffer single shot 1823. Buffer Full latch 1820 being on turns off Service Request at OR 1747 by removing the $\overline{\text{Buffer}}$ Full signal from AND circuit 1749 (FIG. 3*j*). Service Request and Service Out delay reset the Service In latch 1788 (FIG. 3*l*) through AND circuit 1793 and OR circuit 1792. At the fall of the Service In line 1626 the channel responds by dropping Service Out. During the Burst mode the Select Out line 1627 remains up, which keeps the Operational In line 1629 up and the operation continues with alternate Service In and Service Out signals without any further addressing. The Proceed latch 1772 (FIG. 3*k*) will remain on until Operational In drops, when it is reset by $\overline{\text{Operational}}$ In. Request latch 1740 remains on until Select Out drops being reset by $\overline{\text{Select}}$ Out S-In tag latch, and Command Interlock through AND circuit 1760.

The Incremental Drive latch A 1878 (FIG. 3*l*) is set by the output of AND circuit 1882 including Drive CB1, $\overline{\text{Feed}}$ Interlock, Card In Punch Station, Buffer Full and $\overline{\text{Punch}}$ End Sequence. Four microseconds after Punch CB1 emits a pulse, the Reset Data Register single shot or monostable multivibrator 1858 (FIG. 3*d*) is turned on by the output of AND circuit 1859 as is the Set Data Register, single shot or monostable multivibrator 1857. The AND circuit 1856 is gated by the Set Data Register single shot signal and gates the output from the buffer latches 1640A through 1640I to the Data Register latches 1643A to 1643I through AND circuits 1645A through 1645I and OR circuits 1646A through 1646I (FIG. 3*a*). Set Data Register Write single shot 1857 going off turns on $\overline{\text{Set}}$ Data Register Write single shot 1854 through inverter 1855 (FIG. 3*d*) to set the Punch Enable latch 1845 with $\overline{\text{Stop}}$ signal through AND circuit 1845'. With the Punch Enable latch 1845 turned on, the data in the Data Register is punched by the selected punch magnet drivers being gated by Punch Enable through AND circuits 1649A through 1649I (FIG. 3*a*) with the outputs of the Data Register latches 1643A to 1643I. $\overline{\text{Set}}$ Data Register Write single shot 1823 resets the Buffer Full latch 1820 through AND circuit 1830 and OR circuit 1828 (FIG. 3*c*). This turns on Service Request at OR 1747 by restoring $\overline{\text{Buffer}}$ Full at AND circuit 1749 where the signal is gated with the Write signal from OR circuit 1750 (FIG. 3*j*). When punch circuit breaker Punch CB2 emits a pulse, the Punch Compare latch 1844 (FIG. 3*d*) is set through AND circuit 1846 and OR 1847; data that was punched is sent to the bit match 1658 for comparison with the data in the Data Register latches 1643A through 1643I.

*Stop after write operation*

When the channel is ready to complete the Write operation it responds to Service In on line 1626 with Command Out on line 1622. Service In and Command Out set the Stop latch 1800 (FIG. 43*k*) through AND circuit 1804 and OR circuit 1802. Service In, Command Out delayed, from delay device 1779 and Write, turn on the Reset Buffer single shot 1824 (FIG. 3*c*) through AND circuit 1826 and OR circuit 1825. They likewise turn on the Set Buffer Write single shot 1821. The Set Buffer Write pulse going off turns on the Buffer Full latch 1820 through inverter 1822 and $\overline{\text{Set}}$ Buffer single shot 1823. The Buffer Full latch turning on removes $\overline{\text{Buffer}}$ Full from AND circuit 1749, removing the input to OR circuit 1747 (FIG. 3*j*) and causing the fall of Service Request output from this OR circuit. The fall of the Service Request signal resets the Service In latch 1788 (FIG. 3*l*) through inverter 1795, AND circuit 1793 and OR circuit 1792. The fall of the Service In signal on line 1626 causes the fall of Command Out from the channel. The I/O will normally reach its ending point before the fall of Command Out. Under these conditions the $\overline{\text{Set}}$ Data Register Write single shot 1854 (FIG. 3*d*) sets the Punch End Sequence latch 1852 through AND circuit 1853. The Punch End Sequence latch 1852 sets the END latch 1670B through AND circuit 1695, OR circuit 1693 and AND circuit 1692 (FIG. 3*k*). The END latch 1670B sets the Unit Free latch 1670C through AND circuit 1671, and the fall of the output of the Feed latch 1871, which is reset by the signal from the Feed CB2 single shot 1851. $\overline{\text{End}}$ Received, and $\overline{\text{Queued}}$ turn on Interrupted Request or Attention through AND circuit 1752 and OR circuit 1761 (FIG. 3*j*). When Command Out falls, the Status In latch 1763 (FIG. 3*l*) is set by Request latch, $\overline{\text{Command}}$ Out, $\overline{\text{Address}}$ Match latch and Interrupted Request and Attention through AND circuits 1792, 1769 and OR circuit 1767. This raises the Status In line 1625 and the Status bits are gated to the BUS IN 1611–1619 lines through AND circuits 1672A through F (FIG. 3*k*) respectively (in this instance Unit Free and End, the 5 and 4 bits respectively).

The response of the channel to the Status In signal is Service Out on line 1623. Service Out completes End operation. Service Out, Unit Free, Status In, and $\overline{\text{Busy}}$, reset the Command Interlock latch 1815 through AND circuit 1819 and OR circuit 1818 (FIG. 3*j*). Service Out or Command Out delay from OR 1784 resets the Status In latch 1763 through OR circuit 1782. Status In being turned off drops the Status In line 1625. The response of the channel is to turn off the Service Out signal on Service Out line 1623. $\overline{\text{Command}}$ Interlock resets the Command latches 1710A to 1710D through AND 1719 (FIG. 3*g*) and the Command Stored signal from OR circuit 1718 is dropped. $\overline{\text{Command}}$ Stored resets the Buffer Full latch 1820 through OR 1828, Unit Free latch 1670C, and End latch 1670B, Punch End Sequence latch 1852, Stop latch 1800 through OR 1806, and Incremental Drive A and B latches 1880 and 1881 through OR 1885, as well as the Punch Compare latch 1844 through OR 1849.

*Burst mode—Read Command*

A Read Command will cause the feed clutch 1866 to be picked through AND 1868', OR 1886 and Feed latch 1867 and a card will be read serially column after column starting with column 1. As this card is being read, the previous one at the punch station will be moved past the punch station at reading speed and ejected into the stacker. Each character will be checked through validity check circuit 1663 for invalid combinations of punches on the card. There is the usual feed check for each card entering the read station insuring that the card is positioned correctly as well as proper function of all the lights and solar cells in the reading mechanism. After having read a card, and converting the card code into machine code, this character is stored in the buffer register 1640 and the machine is now ready to transmit this byte of information to the interface channel. The selection for a Read operation is the same as the selection for a Write Command until the time the channel responds to Address In from the selected I/O device by placing the Command byte on the BUS OUT. Instead of placing the Write Command bits on the BUS line, as hereinbefore described, the Read bits 6 and $\overline{7}$ are placed in the BUS OUT, and the channel then sends Command Out. The output of the AND circuit 1712 gated with the read command bits from a BUS OUT channel turn out the read latch 1710A through AND circuit 1711A.

When Read Emit 1 is conditioned to emit a pulse, the Reset Data Register single shot 1858 is turned on through AND circuit 1860 with the Read signal and OR circuit 1859. When the Set Data Register Read signal from AND circuit 1863 is turned on, the bits read by the solar cells 1675A–1675I are translated to an 8-bit code through AND circuits 1690A, OR circuits 1691A and OR circuit 1656A–F, whence, they are gated to the data register latches 1643A through 1643I through AND circuits 1646A–I and AND circuits 1679A–I being gated by the Set Data Register Read signal.

When Read Emit 2 is conditioned, $\overline{\text{Stop}}$ latch and Read combine to turn out the Compare Strobe single shot 1840 through AND circuit 1842 and OR circuit 1841. This sets the Data Register Full latch 1835 through AND circuit 1836. Data Register Full, $\overline{\text{Service}}$ In, $\overline{\text{Overrun}}$, $\overline{\text{Buffer}}$ Full, turn on the Reset Buffer single shot through AND circuit 1827 and OR circuit 1825, also turning on the Set Buffer Read single shot 1821. The data is then transferred to the Buffer Register 1640 being gated from data register latches 1643A–I to Buffer Register latches 1640A–I by Set Buffer Read In, AND circuits 1644A–I and through OR circuits 1642A–I.

While Read Emit 2 is conditioned, the holes in the punched card are read again, translated into 8-bit code and are sent to the bit match 1658 where they are compared in AND circuits such as 1658A and 1658B for comparison with the data of the first read that is stored in the Data Register 1643. Set Buffer Read single shot 1821 going off turns on Set Buffer single shot 1823. This turns on Buffer Full latch 1820. Buffer Full and Read turn on Service Request through AND circuit 1748, OR circuit 1747. Service Request, $\overline{\text{Address}}$ Match latch 1730, Request latch 1740 and $\overline{\text{Command}}$ Out set the Service In latch 1788 through AND circuit 1791, AND circuit 1769 and OR circuit 1767. The Service In line is raised and informs the channel of information which is available on the BUS IN 1611–1619. The response of the channel is to raise the Service Out line 1623. Service Out, Service In and Read reset the Buffer Full latch 1820 through AND circuit 1829 and OR circuit 1828. At the fall of Buffer Full, Service Request falls at OR circuit 1747. When Service Out or Command Out delayed at turn on, 4 microseconds after the rise of Service Out through AND circuit 1777, delay device 1785 and OR circuit 1784, the Service In latch 1788 is reset through OR 1782 and the Service In line 1626 drops. The channel responds to the drop of the Service In line 1626 with the drop of the Service Out line 1623.

*Stop after a read operation*

The description of the Read operation is as described. For a Stop operation the response of the channel to Service In is Command Out. Command Out and Service In latch set the Stop latch 1800 through AND circuit 1804 and OR circuit 1802. Stop latch, Write and Status In set the End latch 1670B through AND circuit 1694, OR circuit 1693 and AND circuit 1692. End latch 1670B turns on Interrupt Request or Attention at the OR circuit 1751 through AND circuit 1752. Buffer Full latch 1820 is reset by Read, Command Out at Service In latch through AND circuit 1831 and OR circuit 1828. Buffer Full latch 1820 turning off turns off Service Request at OR circuit 1747 by reason of the output of AND circuit 1748 dropping. Service Out or Command Out delayed and Service Request reset the Service In latch through inverter 1795, AND circuit 1793, and OR circuit 1792. The channel responds with the fall of Command Out line 1622. Supposing that the I/O unit has reached its normal ending point before the fall of Command Out, the Feed latch 1871 will be reset. Feed latch, Status In and End signals set the Unit Free latch 1670C through AND circuit 1671. When Command Out falls, the Status In latch 1763 is set through AND 1770, AND 1791, AND 1769 and OR 1767 by Proceed latch, Command Out, Service Out, Request latch, Address Match latch and Interrupt Request or Attention. Status in Tag 1796, Select Out and Command Interlock 1815 resets the Request latch 1740 through OR 1759 and AND 1760.

The I/O device sends the Status byte to the channel and informs the channel that the stop operation was accepted or rejected. If the Status byte contains all zeros, the Stop operation is accepted. The Stop operation is also accepted when the Status byte contains a 4 or a 5 indicative of the Channel End and OR Unit Free. The channel thereupon responds with Service Out raising the Service Out line 1623. This completes the end of the procedure, Service Out, Status In latch, Unit busy, Unit Free latch, reset Command Interlock latch 1815 through AND circuit 1819 and OR circuit 1818.

The fall of Command Interlock resets the Read Command latch 1710A and turns off the Command Stored signal from OR circuit 1718. Command Stored going off resets the Unit Free latch 1617A, the End latch 1670B and the Stop latch 1800. Service Out or Command Out delay reset the Status In latch 1763 through OR circuit 1782 and the Status In line 1625 falls. The response of the channel to the drop of Status In is the end of Service Out.

Referring to FIGS. 4a and 4b it will be seen that in either a Write or Read operation, as hereinbefore described, is shown as a series of alternating operations between the CPU channel and the I/O unit from initial selection through completion of the operation.

*Data interleave mode—Initial selection Write Command*

The initial selection is as described for Burst mode except that the channel drops the Select Out line 1627 after the rise of the Operational In line 1629. The description of the operation is the same as in the Burst mode up to the time when Status In latch 1763 is turned off and the Status In line 1625 falls.

When the Service Out line 1623 drops, the Gated Status In Tag is turned on at AND circuit 1798 by the rise of Service Out. The Gated Status In Tag, 1798, Request latch, 1740, and Address Match latch, 1730, will set the Command Interlock latch 1815 on through AND circuit 1816. The rise of Command Interlock 1815, the Gated S-In Tag 1798 and Select Out reset the Request latch 1740 through AND circuit 1760 and OR circuit 1759. Gated S-In Tag and Request latch reset Address Match latch 1730. Address Match latch, Status In, Service In, Request latch and Select Out reset the Operational In latch 1734 through AND circuit 1736 and OR circuit 1735, thus dropping the Operational In line 1629. The drop of Operational In resets the Proceed latch 1772 by the rise of Operational In and the Status In Tag latch 1796, causing the Gated Status In Tag line from AND 1798 to drop. Command Interlock turning on turned on Write latch 1710B. When Operational In goes off, the Request latch 1740 is set by Select Out, Operational In, Buffer Full and Write through OR circuit 1750, AND circuit 1749, OR circuit 1747, OR circuit 1746, AND circuit 1744 and OR 1742, Buffer Full and Write turning on Service Request. The same selection procedure is required each time a new operation is initiated.

When Select Out comes up on line 1627, the I/O unit will turn on the Operational In latch 1734, through OR 1732 and AND 1731 due to Request latch 1740, Select Out and Select Out delay being on. Operational In latch 1734 turning on causes the Address In line to rise through AND circuit 1738 and delay 1739, and the I/O unit places its address on the BUS IN lines 1611 through 1619. The channel responds with Command Out by raising Command Out line 1622, which sets the Proceed latch 1772 through AND circuit 1776 and delay devices 1779 and 1780. Proceed latch 1772 turns off the Address In by removing the Proceed signal from AND circuit 1738. The fall of Address In resets Command Out and Command Out going off turns on the Service In latch 1788 through inverter 1774, AND circuit 1770, AND circuit 1791, and AND circuit 1790. The Service In line 1626 is raised through delay device 1789 and AND circuit 1786. The channel responds with Service Out by raising the Service Out line 1623 and places the punch data on the BUS OUT lines 1601 to 1609.

The Service In delay sets the Status In Tag latch 1796 and the Gated Status In tag output from AND circuit 1798 raises because Command Out, Service Out and Service In latch are off. The Status In Tag latch 1796 resets the Request latch 1740 through AND circuit 1760 and OR circuit 1759. Service Out turns off the Gated Status In Tag at AND 1798. Write, Service In latch and Service Out or Command delay turn on the Buffer Reset single shot 1824 and the Set Buffer Write single shot 1821, causing the data from the channel on the BUS OUT lines to be stored in the latches 1640A–1640H of the Buffer Register 1640 through AND circuits 1641A–1641H. Set Buffer Write single shot going off sets Buffer Full latch 1820. Buffer Full latch 1820 being set turns off Buffer Full and Buffer Full causes the end of Service Request at OR 1747 through AND circuit 1749. Service In latch 1788 is reset by Service Request through inverter 1795 and Service Out or Command Out delay. The fall of Service In resets the Operational In latch 1734 through AND circuit 1376 and OR circuit 1735. This resets the Proceed latch 1772 through the Operational In signal. The Status In Tag latch 1796 is likewise reset. After the drop of the Service In line 1626, the channel drops Service Out.

*Stop operation after a punch operation*

At the termination of a punch operation, the channel turns on Select Out line 1627 and the I/O line device raises the Operational In line 1629 because the Request latch 1740 is set. The Request latch is set by Buffer Full and Write through AND 1749, OR 1747 and OR 1746, Operational In, Select Cut through AND 1744 and OR 1742. Operational In 1734 being operated turns on Address In through AND circuit 1738, and the unit places its address on the BUS IN lines; the channel responds with Command Out on line 1622 which sets the Proceed latch 1772 through AND 1776. The Proceed latch drops Address In by removing the Proceed signal from AND circuit 1738. When the channel drops Command Out, the Service In latch 1788 is set through AND 1790.

At this time the following signals are on: Service In latch 1788, Write 1710B, Service Out, and Command delayed, turn on the Reset Buffer single shot 1824 and the Set Buffer Write single shot 1821. The Buffer Full latch 1820 is set through the Set Buffer SS 1823 by the Set Buffer Write single shot 1821 going off. The rise of Buffer Full causes Service Request to rise at OR circuit 1747. The Request latch 1740 is reset by the Status In Tag latch 1796 output at AND circuit 1760 through OR circuit 1759, the latch being set by Service In delayed.

The channel responds to the raising of the Service In line 1626 by raising the Command Out line 1622. Command Out and Service In now set the Stop latch 1800 through AND circuit 1804 and OR 1802. The Service In latch 1788 is reset by Service Request and Service Out or Command delayed. Service In 1788 going off resets Operational In 1734 which, in turn, resets the Status In Tag latch 1796 and Proceed latch 1772. The I/O line unit proceeds to its normal ending point.

When Set Data Register Write single shot 1854 turns on, the Punch End Sequence latch 1852 is set through AND 1853 because the Stop latch 1800 is up. The signals of the Punch End Sequence, Compare and Status In set the End latch 1670B. End latch, End Received 1670A and Queued 1808 turn on Interrupted Request and Attention through OR circuit 1751 and AND circuit 1752, and the Request latch 1740 is set through OR 1746, AND 1744 and OR 1742.

When Feed latch 1871 drops the Unit Free latch 1670C is set. When the channel raises the Select Out line 1627, the Operational In latch 1734 is set by Request latch, Select Out and Select Out delayed through AND 1741 and OR 1731. The Address In line 1624 is raised through AND 1738 and the unit address is placed on the BUS IN lines 1611 through 1619. The channel responds with Command Out on line 1622. Command Out sets the Proceed latch 1772 through AND 1776 which causes the drop of the Address In line 1624 by removing the Proceed input from AND circuit 1738. The channel in response drops the Command Out signal of line 1622. When Command Out drops Status In latch 1763 is set by the Command Out signal and the status bits are sent on BUS IN; Status In delay sets the Status In Tag latch 1796.

The stop operation reaches its end when Service Out comes on on Interface Tag line 1623. Service Out resets Command Interlock 1815, which resets the Command latches including the Write latch 1710B and causes the fall of the Write signal and Command Stored signals at OR 1718. Command Stored falling resets the Unit latch 1670C by raising the Command Stored output. End latch 1670B, Punch End Sequence latch 1852, Buffer Full latch 1820 and Stop latch 1800 are likewise set. Service Out or Command Out delayed resets the Status In latch 1763, which causes the reset of Operational In latch 1734 through AND 1736 and OR 1735. The drop of Operational In resets the Proceed latch 1772 and the Status In Tag latch 1796 through the Operational in signal.

*Data interleave mode—Read Command*

The selection procedure for the Read Command is the same as described in the initial selection Write operation, except that the Read line at AND 1714A is raised instead of Write. This is the same as the Burst mode up to the time when Buffer Full 1820 and Service Request 1747 are up. Buffer Full, Read, Operational In, Select Out, set Request latch 1740 through AND 1748, OR 1747, OR 1746, AND 1744 and OR 1742. When the channel raises the Select Out line 1627 in a search of the unit requiring service, Operational In latch 1734 is set through AND 1741 and OR 1732 and Operational In line 1629 comes up. The I/O unit raises Address In line 1624 through AND 1738 because of Operational In Proceed latch, Address Out signals, and places its address on the BUS IN lines 1611 to 1619. The response of the channel is the Command Out signal on line 1622 with all zeroes on the BUS OUT line 1601 to 1609 which means Proceed. Command Out sets the Proceed latch 1772 and causes the drop of Address In by removing Proceed from AND circuit 1738.

When the channel drops Command Out the Service In latch 1788 is set in response to Service Request from OR 1747, Address Match latch 1730, Request latch 1740, Proceed latch 1772, Service Out and Command Out. The I/O unit places the read data in the buffer register 1640 on the BUS IN lines. Gating of the bits from the buffer register to the BUS IN lines is conditioned by Read and Service In signals. Service In delayed sets the Status In Tag latch 1796 and this latch, in turn, resets the Request latch 1740 through AND 1760. The channel raises the Service Out line, this being an acknowledgement of the receipt of the information on BUS IN. Buffer latch 1820 is reset by Service Out, Service In latch 1788 and Read. Buffer Full causes the Service Request to go off at OR circuit 1747. The Service In latch 1788 is reset by Service Request and Service Out or Command Out delayed. The drop of Service In rests Operational In through AND circuit 1736 and OR circuit 1735. The reset of Service In resets the Status In Tag latch 1796 and the Proceed latch 1772. After the fall of Service In over line 1626, the channel drops Service Out on line 1623. When the Operational In line is down the channel is free for the next operation.

*Stop operation after a read operation*

At the end of a Read operation, the I/O unit raises its Address In line 1624. The channel responds by raising the Command Out line 1622 which turns on the Proceed latch 1772 through AND 1776. The I/O unit then raises its Service In line 1626 after Command Out falls. The operation is as described in the Read operation Data Interleave mode, except that the Stop latch 1800 is set by Command Out and Service In. Stop, Write, Status In, set the End latch 1670B. The conditions of End latch, End Received, Queued latch turn on Interrupt Request and Attention at OR circuit 1751. Command Out, Read and Service In reset the Buffer Full latch 1820 through AND 1831 and OR 1828 which turn off Service Request at OR 1747 through AND 1748. When Service Out and Command Out delayed rise, Service In latch 1788 is reset through AND 1793 and OR 1793. The drop of Service In causes the reset of Operational In through AND circuit 1736. When Operational In falls, the Request latch 1740 is set by Operational In, Select Out and Interrupted Request through AND 1761. Operational In resets the Proceed Latch 1772. The I/O unit proceeds to its normal ending point after the Feed Receive latch 1871 turns off, and the Unit Free latch 1670C is set by Feed C, Status In and End latch 1670B.

When the channel raises the select out line 1627, the I/O device obtains its selection and raises the Operational In line 1629. The Operational In latch 1734 is set by Select Out, Select Out delayed and Request latch at AND 1741. The raise of Operational In turns on Address In through AND circuit 1738 and the unit address is placed on the BUS IN lines. The channel responds with Command Out. Command Out sets Proceed latch 1772 through AND 1776, which drops Address In 1624. Command Out drops in response causing the Status In latch 1763 to be set by Command Out, Service Out, Proceed Request Latch, Address Match latch, Interrupt Request and Attention through AND 1770 and AND 1791, AND 1769 and OR 1767. Status In delayed sets the S-In tag latch 1796, which resets Request latch 1740.

When the channel responds with Service Out on line 1623, the stop operation is completed. Service Out and Command Out delayed reset Status In latch 1763. Command Interlock 1815 is reset by Unit Free 1670C, Status In 1763, Service Out and Unit Busy before Status In 1763 is reset. The fall of Command Interlock resets Read 1710A and drops Command Stored 1718. The drop of Command Stored resets Unit Free latch 1670C, End latch 1670B and Stop latch 1800. Status In resets Operational In 1734 which resets Proceed 1772 and Status In Tag latch 1796.

By referring to FIGS. 5a and 5b it will be seen that the above-described operation also forms a series of signals and responses between the CPU channel and the I/O control unit, with Select Out being dropped each time Address In is sent to permit the I/O unit to seize the channel. The channel is selected by the I/O unit for each byte of data by responding to Select Out with Operational In and Address In.

The Suppress Interrupt line is used to block Interrupt Request 1751 at the I/O by removing the input to AND 1753 from inverter 1755. This prevents this I/O from taking over the channel on a priority basis.

When it is desired to check the condition of the Status latches 1670, the Test I/O latch 1710 is set by sending all zeros with Command Out after selection of the I/O unit. This blocks the setting of Request latch 1740 at AND 1743 and blocks a Busy Status from OR 1697 by removing $\overline{\text{Test}}$ I/O from AND 1698A. The condition of the Status latches is reported with Status In and the cycle terminates.

While the invention has been particularly shown and described with reference to a preferred embodiment thereof, it will be understood by those skilled in the art that various changes in form and details may be made therein without departing from the spirit and scope of the invention.

What is claimed is:

1. The combination with a stored program controlled computer central processing unit having an interface connected thereto including a plurality of BUS Out data lines disposed for connection to a plurality of remote I/O control units, a plurality of tag control lines including Address Out and Operational In lines, and periodically pulsed serially related Select Out and Select In selection lines of,
    address means in the control unit for producing address signals designating an address for the control unit,
    address match means connecting the address means and the BUS Out lines to provide a signal upon a match of an address placed on the Bus Out by the central unit with that of the control unit,
    means jointly responsive to the address match signal, a pulse on the Select Out line,, and a signal from the central unit on the Address Out line connected for producing a response signal from the particular control unit to the central unit over the Operational In line, and
    switch means connected between the Select Out and Select In lines responsive to said response signal for disconnecting the Select Out and Select In lines at said I/O control unit.

2. In combination with a stored program controlled computer central processing unit having connected thereto an interface for transmitting data, control and selection signals between the central unit and a plurality of control units, including Bus Out data lines connected for transmitting data to the plurality of remote control units, Bus In lines for transmitting data from said control units to the central unit, a plurality of tag control lines including Operational In, Address In and Service In lines from the control unit to the central unit, and a Command Out line to the control unit, and periodically pulsed serially related Select Out and Select In selection lines for polling the control units of,
    request means at the control unit responsive to a need of the control unit device for service from the central unit for producing a request signal,
    address means at each control unit for producing address signals individual to the unit,
    address matching means for producing a signal in response to the matching of an address on the Bus Out lines with the address of the particular control unit,
    switch means operable to interrupt the serial relation of the Select Out and Select In lines at the control unit,
    control means responsive to said request signal and the next pulsing of the Select Out lines for effecting operation of said switch means and effecting energization of the Operational In line, and
    means responsive to said control means in the absence of an address match for effecting energization of the Address In line and gating the control unit address onto the Bus In lines.

3. In combination, a computer central processing unit having an interface disposed to connect the central unit to a plurality of control units including Bus Out lines for transmitting data from the central unit to the control units, Bus In lines for transmitting data from the control units to the central unit, an Address Out tag line, an Address In tag line, a Command Out tag line, periodically pulsed serially related Select Out and Select In lines connected between the central unit and the control units in a closed loop, and a Suppress Interrupt interlock line connecting the central unit to each of the control units of,
    means including a delay device and a switch device normally connecting the Select Out line and the Select In lines in a series relation through each control unit,
    means at each control unit for producing characteristic address signals,
    address match means for operating said switch means to interrupt the series relation of the Select Out and Select In lines at a control unit in response to a match between an address put on the Bus Out by the channel and the address signals of the unit to permit the central unit to select said unit,
    request means responsive to a request for service by the unit and pulsing of the Select Out line for effecting energization of the Operational In line and operating said switch device in accordance with a predetermined order of priority among the control units, and
    means responsive to energization of the Suppress Interrupt line by the central unit for preventing operation of said request means so as to permit the central unit to take priority over any of the control units.

4. In combination with a stored program controlled computer central processing unit having an interface disposed to connect said unit to a plurality of remote device control units including Bus Out lines for transmitting data from the central unit to the control units, Bus In lines for transmitting data to the central unit from the control units, an Operational In line for selectively effecting connection of the control unit to the central unit at the control units choice, an Address In line for effecting transmission of the control units address to the central unit, a Service In line for effecting transmission of data from the control unit to the central unit, a Command Out line for signalling the control unit to proceed, and serially related periodically pulsed Select Out and Select In selection lines for periodically polling the control units,
    a buffer register at the control unit disposed to contain data to be sent to the central unit,
    a request latch operable in response to a buffer full condition of the control unit requiring it to send information to the central unit over the Bus In lines,
    means including a delay device and switch means at the control unit connecting in serial relation the Select Out and Select In lines, said switch means being operable to interrupt said relation,
    operational means jointly responsive to operation of the request latch and pulsing of the Select Out line to effect operation of the switch means and raise the Operational In and Address In lines, means responsive to raising the Address In line to place the control unit address on the Bus In lines, means including a proceed latch activated by a proceed signal from the central unit in conjunction with a signal raising the Command Out line, means responsive to operation of the proceed latch to turn Address In off causing the central unit to drop the Command Out line, a Service In latch activated by the drop of the Command Out line, and means responsive to operation of the Service In latch to gate information in the buffer register to the central unit over the Bus In lines.

5. For use with a programmed computer central processing unit disposed to be connected by an interface to a plurality of device control units, said interface comprising a plurality of Bus Out lines for transmitting data from the central unit to the control units, a plurality of Bus In lines for transmitting data from the control units to the central unit, an Address Out line for transmitting a signal from the central unit with the address on the Bus Out line for the selection of a control unit, an Address In line for sending a signal to the central unit with the address of a selected control unit, a Command Out line for transmitting a command signal to a selected control unit with command bits on the Bus Out lines, an Operational In line connecting the control units to the central unit, and serially related periodically pulsed Select Out lines connected from the central unit through each of the control units to a return Select In line back to the central unit, means at each control unit for producing coded address signals designating the particular unit, means including a delay device and a switch device connected in circuit with the Select Out lines at each control station for selectively effecting delayed propagation of a pulse along the Select Out line, said switch device being operable to interrupt connection of the Select Out line, control means responsive jointly to occurrence of a pulse on the Select Out line, a match between the address signals of the control unit and an address on the Bus Out lines, and a signal on the Address Out line to effect operation of said switch device, and energize the Operational In and Address In lines, means responsive to energization of the Address In line to gate the unit address signals to the central unit on the Bus In lines, and means responsive to energization of the Command Out line by the central unit and the command bits on the Bus Out lines to produce a command signal for effecting operation of a device controlled by the control unit.

6. For use with a micro-programmed stored program central processing computer unit disposed to be connected to a plurality of remote device control units by an interface comprising a plurality of Bus Out lines for transmitting data from the central unit to the control units, a plurality of Bus In lines for transmitting data from the control units to the central unit, an Address Out line for transmitting a control signal to the control units in conjunction with an address on the Bus Out lines from the central unit, an Address In line, an Operational In line and a Status In line for transmitting signals to the central unit from the control units, a Command Out line for sending a signal to the control units in conjunction with coded command bits on the Bus Out lines, and serially connected periodically pulses Select Out and Select In lines for rippling pulse signals from the central unit through the control units and back to the central unit of address means at each unit providing a different combination of bit signals representative of the particular control unit address, select means including delay means and controllable switch means providing a connection through each control device for the Select Out line, an address match circuit connected to the Bus Out lines and the address means for producing an address match signal when the control unit address matches an address on the Bus Out lines to effect operation of the switch device to interrupt the Select Out line at the control unit, an address match latch connected to respond to concurrence of an address match signal, a signal on the Address Out line and a pulse on the Select Out line, an Operational In latch connected to operate in response to operation of the address match latch for effecting energization of the Address In line and the Operational In line, means responsive to energization of the Address In line for gating the control unit address to the central unit on the Bus In lines, a plurality of command latches for effecting selection operation of the control unit device, and means responsive to energization of the Command Out line by the central unit and the placing of the command bits on the Bus Out lines for selectively effecting operation of one of said command latches to operate the control unit device in accordance with the command bits.

7. For use with a programmed central processing computer unit disposed to be connected with a plurality of remote device control units by an interface including a plurality of Bus In lines for receiving coded data from the control units, a plurality of Bus Out lines for transmitting data to the control units from the central unit, a Command Out line for sending a command signal from the central unit to a control unit in conjunction with command bits on the Bus Out lines, Operational In and Address In lines for sending control signals from the control unit to the central unit, and serially related periodically pulsed Select Out and Select In lines for rippling select pulses from the central unit through the control units and back to the central unit, of means at the control unit for producing coded address signals representative of the control unit address, means at the control unit operable to produce a signal in response to a condition of the device requesting service over the interface, means including a delay device and switch means at each control unit connected in series with the Select Out line, said switch devices being operable to interrupt said line, request means operable to produce a signal in response to operation of the device response means and effect operation of the switch means to interrupt the Select Out line, means responsive to operation of said request means for energizing the the Address In and Operational In lines, gating means responsive to energization of the Address In line to gate the control unit address signals to the central unit on the Bus In lines, and means including a plurality of command latches selectively controlled by coded command bits transmitted from the central unit over the Bus Out lines in conjunction with a signal on the command out line for effecting operation of the device and effecting deenergization of the Address In line.

No references cited.

ROBERT C. BAILEY, *Primary Examiner.*

R. ZACHE, *Assistant Examiner.*